United States Patent
Jain et al.

(10) Patent No.: US 12,469,188 B2
(45) Date of Patent: Nov. 11, 2025

(54) STOCHASTIC COLOR MAPPING TO GENERATE MULTIPLE COLOR PALETTE VARIATIONS

(71) Applicant: Adobe Inc., San Jose, CA (US)

(72) Inventors: Vishwas Jain, Bengaluri (IN); Vineet Batra, Delhi (IN); Sumit Dhingra, Delhi (IN); Sumit Chaturvedi, Noida (IN); Souymodip Chakraborty, Bengaluru (IN); Ankit Phogat, Noida (IN)

(73) Assignee: Adobe Inc., San Jose, CA (US)

( * ) Notice: Subject to any disclaimer, the term of this patent is extended or adjusted under 35 U.S.C. 154(b) by 134 days.

(21) Appl. No.: 18/370,286

(22) Filed: Sep. 19, 2023

(65) Prior Publication Data
US 2025/0095228 A1    Mar. 20, 2025

(51) Int. Cl.
*G06T 11/00*    (2006.01)

(52) U.S. Cl.
CPC .................. *G06T 11/001* (2013.01)

(58) Field of Classification Search
CPC ..... G06T 11/001; G06T 7/90; G06T 2200/24; G09G 5/02; G09G 5/06
See application file for complete search history.

(56) References Cited

U.S. PATENT DOCUMENTS

| | | | |
|---|---|---|---|
| 10,168,879 B1 * | 1/2019 | Duan .................... | G06T 11/203 |
| 11,043,012 B2 | 6/2021 | Phogat et al. | |
| 11,551,384 B2 * | 1/2023 | Phogat .............. | G06F 18/23213 |
| 12,217,459 B2 * | 2/2025 | Batra ......................... | G06T 7/90 |
| 2016/0357713 A1 * | 12/2016 | Tocchini ............... | G06T 11/001 |
| 2019/0279402 A1 * | 9/2019 | Panetta ..................... | G06T 7/10 |

OTHER PUBLICATIONS

Afifi et al. "Image recoloring based on object color distributions" May 2019. https://www.researchgate.net/publication/337934924 (Year: 2019).*

Bahng et al., "Coloring with Words: Guiding Image Colorization Through Text-based Palette Generation," arXiv: 1804.04128v2: 22 pages (2018).

(Continued)

*Primary Examiner* — Antonio A Caschera
(74) *Attorney, Agent, or Firm* — KDW FIRM PLLC

(57) ABSTRACT

Recoloring a target graphic using color palettes generated using a stochastic color mapping process. One method of recoloring a target graphic using the stochastic color mapping process includes obtaining a target graphic to be recolored and a source color palette defining source colors for recoloring the target graphic. A target color set of target colors is extracted from the target graphic. The method includes computing a mapping to map source colors of a source color palette to target colors extracted from a target color set of the target graphic based on a transition probability. A destination color palette of destination colors is determined based on the mapping. The target graphic is modified by recoloring at least one object in the target graphic with a destination color from the destination color palette.

20 Claims, 20 Drawing Sheets
(10 of 20 Drawing Sheet(s) Filed in Color)

(56) References Cited

OTHER PUBLICATIONS

Bertsekas, "An Auction/Sequential Shortest Path Algorithm for the Minimum Cost Network Flow Problem," Department of Engineering and Computer Science, M.I.T.: 20 pages (Feb. 1995).
Chang et al., "Palette-based photo recoloring," ACM Transactions on Graphics, vol. 34(4): Article No. 139: 11 pages (Jul. 27, 2015).
Goldberg et al., "Finding Minimum-Cost Circulations by Successive Approximation," Mathematics of Operations Research, vol. 15(3): 430-466 (1990).
Goodfellow et al., "Generative Adversarial Networks," arXiv: 1406.2661v1, 9 pages (Jun. 10, 2014).
Ho et al., "Denoising Diffusion Probabilistic Models," ArXiv:2006.11239v1, abs/2006.11239: 24 pages (Jun. 19, 2020).
Rubner et al., "The Earth Movers Distance as a Metric for Image Retrieval," International Journal of Computer Vision, vol. 40: 99-121 (2000).
Shrugrina et al., "Playful Palette: An Interactive Parametric Color Mixer for Artists," ACM Transactions on Graphics, vol. 36(4): Article 61: 10 pages (Jul. 2017).

* cited by examiner

STOCHASTIC COLOR MAPPING TO GENERATE MULTIPLE COLOR PALETTE VARIATIONS

BACKGROUND

Image recoloring is the use of graphics editing software to modify the color scheme or theme of a digital image. The process manipulates an image's color values (e.g., red, blue, green (RGB) values; hue, saturation, and lightness (HSL) values; etc.) to give the image a new appearance, for example, that conveys a different look and feel. Illustrative themes include pre-existing color palettes such as "forest," "evening sunset," "tropical," "neon," etc., that are associated with a palette of colors. A theme can also be based on a color palette of a particular image. For example, a designer working on a first image could be influenced by a color theme from a second image, and may wish to replicate the color theme from the second image to the objects in the first image. During the image recoloring process, a user provides a desired color palette (for instance, based on a pre-existing theme or an image with a desired color theme) and a target image to be recolored as input. The graphics editing software generates a modified target graphic by transferring colors from the desired color palette to replace the colors of the target graphic.

SUMMARY

Exemplary embodiments are generally directed to a graphic recoloring process for transferring colors from a source color palette to a target graphic. In certain embodiments, the recoloring process uses a stochastic color mapping technique to determine a destination color palette by mapping the colors of the source color palette to colors of the target graphic using a flow-based probabilistic and randomized process for determining the color mappings. In some embodiments, the flow-based process is a stochastic earth mover distance (EMD) method in which the computed EMD distributions are used as sampling probabilities for the color mappings. The destination color palette is used to recolor the target graphic to create a modified target graphic in which the original colors of the target graphic have been replaced with the colors of the destination color palette. The probabilistic configuration of the stochastic color mapping process facilitates the creation of a wide array of different and aesthetically pleasing color palettes for recoloring a target graphic because the stochastic color mapping process generates different outputs (i.e., multiple varying destination color palettes for recoloring a target graphic) based on the same input (i.e., a target graphic and a source color palette) through the use of randomized color distribution probabilities.

In some embodiments, colors are clustered and de-clustered during the recoloring process. Color clustering operates to group colors extracted from the target graphic according to one or more color properties, such as hue and/or lightness. In some embodiments, color clustering includes grouping the extracted target graphic colors into clusters based on the one or more color properties. Once all of the colors have been assigned to a cluster, the colors in each cluster are reduced to a single color that is an average of all of the colors in the cluster. The clustering process creates a clustered color palette. The stochastic color mapping process receives the clustered color palette as input and generates a clustered destination color palette by mapping the colors of a source color palette to the colors of the clustered color palette. The use of a clustered color palette allows stochastic color mapping to operate on a smaller set of colors while maintaining certain color relationships, enabling, for example, the recoloring process to run in a reduced and more efficient time frame.

De-clustering operates to de-cluster the colors of a clustered destination color palette following color mapping to generate a destination color palette that is used to recolor the target graphic. The destination color palette includes a greater number of colors compared with the clustered color palette, while maintaining certain color property relationships, for example, hue, lightness, and/or contrast relationships, present in the original colors from the target graphic. The de-clustering process is used to restore the original colors in the vector graphic after the clusters have been mapped using the stochastic color mapping process. De-clustering operates to maintain the original hue, lightness, and/or contrast relationships present in the original colors of the target graphic. Maintaining color relationships in the recolored target graphics via de-clustering facilitates improved continuity and aesthetic properties in recolored graphics.

These illustrative embodiments are mentioned not to limit or define the disclosure, but to provide examples to aid understanding thereof. Other embodiments are described and claimed.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

To easily identify the discussion of any particular element or act, the most significant digit or digits in a reference number refer to the figure number in which that element is first introduced.

DETAILED DESCRIPTION

Figure 1:
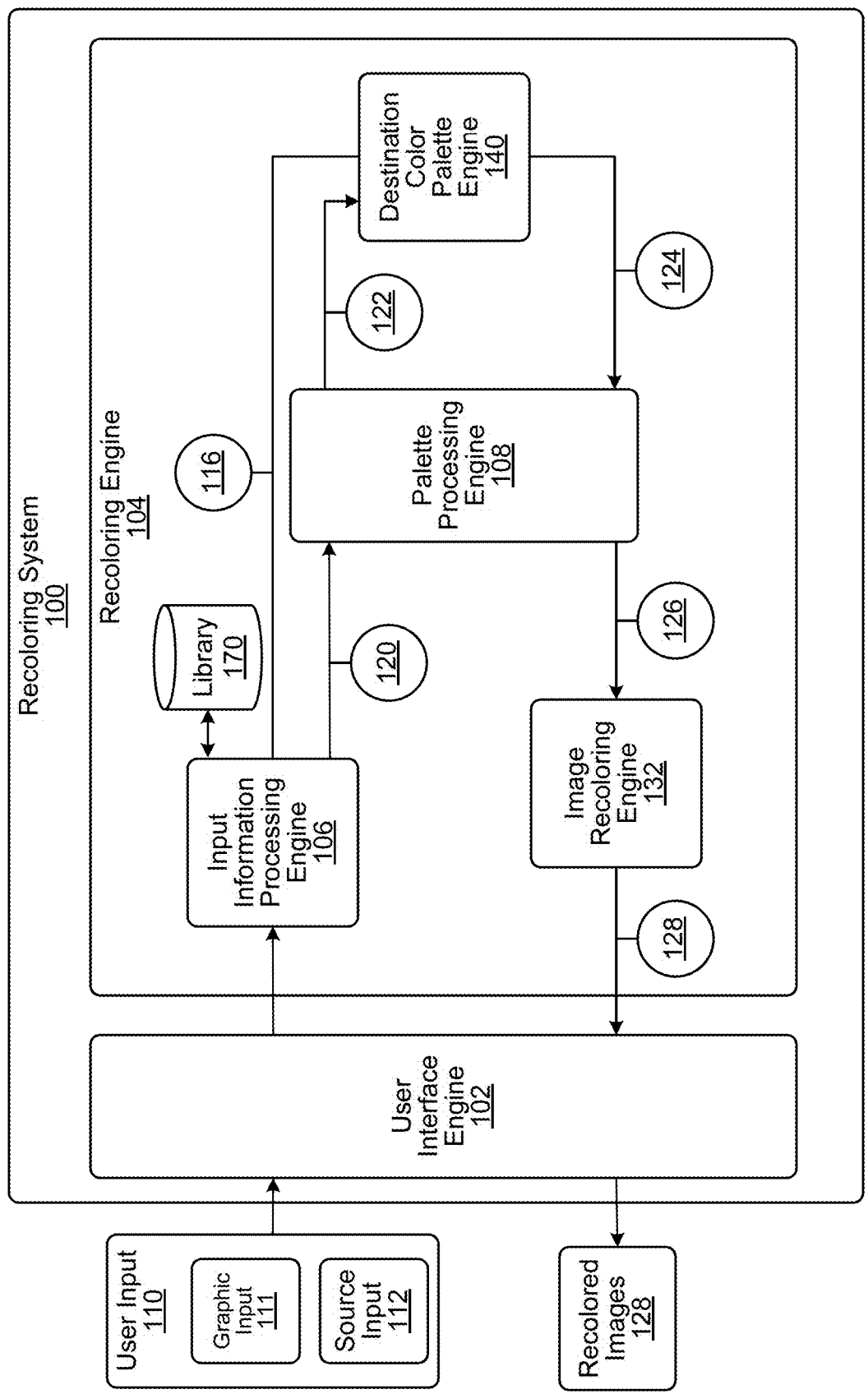
FIG. 1 illustrates a recoloring system according to one embodiment.

Designers use various processes for creating images and graphics, for example, for marketing materials, website design, artistic expression, personal creativity, etc. In general, a graphic is a digital file or graphical element of a visual representation of content. A graphic can be or can include an image, text, objects, shapes, lines, etc. Often designers have a theme, an idea, or a particular reference that serves as a basis of colors used in the design of a graphic. Illustrative themes include pre-existing subjects such as "forest," "evening sunset," "tropical," "neon," etc., that are associated with a palette of colors. A theme can also be based on a unique color palette used in a particular image. As part of the design process, designers typically explore with colors and themes of existing images. One process is image recoloring which is used to transfer a desired color palette to a target graphic. However, exploring potential color theme variations is a mentally challenging task that can be very time consuming because designers have to manually select image areas, objects, colors, etc. and apply new colors or color properties (e.g., saturation, lightness, etc.). Existing systems have attempted to automate some or all of this process. Nevertheless, automated systems remain challenging for designers because these systems typically generate inadequate results that do not fully capture the designer's desired theme. As a result, designers are still required to manually manipulate the colors of the recolored graphic in order to obtain the preferred color theme and overall look-and-feel of the graphic colors.

Vector graphics (as opposed to pixel-based raster or rasterized graphics) are digital images created with mathematical equations that represent lines, curves, shapes, areas, etc. within an image instead of pixels, and are widely used in graphic design, animation, and other digital media applications. Although vector graphics provide some benefits for the recoloring process, conventional vector graphic applications are limited in their ability to generate a wide range of color variations from a single source graphic. Conventional processes for recoloring vector graphics typically involve manually selecting curves, shapes, etc. and applying new colors while ensuring that the colors harmonize with the overall design. This process is inefficient and tedious as it is not a trivial task to come up with a replacement color for every color and/or object. In addition, designers are not able to view new color additions in combination with previous image iterations (for example, coloring an object "blue" may not be aesthetically pleasing with a current color combination, but may have harmonized with colors in a previous iteration formerly changed by the designer). Naively applying raster-based recoloring processes on vector graphics (and vice versa) generally creates unaesthetic, disjointed results.

Text-to-Image generation models are currently configured for the creation of images, color palettes, and other graphic elements from a single text prompt. Prominent text-to-image systems include text-to-image diffusion models and text-to-image generative adversarial networks (GANs) that generate images and image elements from natural language prompts. For example, a text-to-image system can receive a user prompt (e.g., "boat in a harbor") as input and will generate various images based on the input. A user can also enter thematic information, such as "sunset," "abstract," "realistic," "dark," "harmonious," etc. and images are presented that are rendered in that theme or style.

Text-to-image systems are also capable of generating color palettes based on user input. For example, a user can enter a text prompt, such as "warm," "blue," "neon," "pastel," etc. in a text-to-image system to receive a corresponding color palette that is used to color an image. However, palette creation using conventional text-to-image systems typically relies on small and annotated datasets that substantially limit the input vocabulary and palette output choices. For example, a text-to-image prompt of "pastel" may provide a single, limited pastel-based color palette that does not change in subsequent uses (i.e., the same color palette will be generated each time a user enters the "pastel" prompt). Accordingly, even with the use of conventional automated systems, designers are still only supplied with repetitive, commonplace color palettes with little to no variation instead of new, innovative, and distinctive color pallets harmonized within the scope of a desired theme.

Embodiments attempt to solve these and other challenges by implementing improved recoloring processes using stochastic color mapping techniques and a color clustering/declustering process. In the recoloring process, color information is transferred from a source color palette to a target graphic using a stochastic color mapping or flow, which maps colors of the source graphic to corresponding colors of the target graphic. In one example, a graphics editor provides a recoloring workflow in which color palettes are extracted from a target graphic being edited and from one or more source color palettes (or source graphics) having color combinations that a user wishes to apply to the target graphic. In the workflow, the graphics editor uses the extracted color palettes to compute a transfer function that provides a mapping or flow between colors of the source color palette and colors of the target graphic.

The target graphic and the source graphic need not have the same semantic content. For instance, the target graphic could depict a scene of a neighborhood on a sunny, fall day, whereas the source graphic could depict a sea lion swimming in an aquarium. A user may wish to change the color scheme of this target graphic, which might include predominantly orange and red coloring, to more closely resemble the color scheme of the source graphic, which might include predominantly blue and yellow coloring. To implement this change, the graphics editor computes a palette mapping or flow that maps colors of a source color palette from the source graphic to colors of a target color palette from the target graphic. Each of these color palettes includes a set of colors that occur within the graphic, along with weights associated with respective densities of the colors within the color palette (e.g., how much of the graphic includes content having a particular color).

The stochastic color mapping process operates such that certain weighted combinations of colors in the source graphic are used as a probabilistic distribution for replacing colors in the target graphic. In this manner, probability and randomness are introduced as part of the color mapping process to generate multiple different color palettes from a single set of source colors, while maintaining color relationships to facilitate the creation of harmonious color palettes for recoloring graphics. For instance, in the aquarium-neighborhood example above, the palette mapping generates multiple mappings in which different colors in the aquarium scene are to be mapped, via a weighted combination of these colors, to certain colors in the neighborhood scene. The multiple mappings are used to generate a set of modified, recolored graphics, with each graphic in the set recolored using a different color palette based on the source graphic. For instance, in one example, a first recolored graphic is created by mapping shades of blue in the aquarium scene, determined via a weighted combination of these blue colors based on a probabilistic distribution, to an orange color in the neighborhood scene; a second recolored graphic is created by mapping shades of yellow in the aquarium scene, determined via a weighted combination of these yellow colors based on a probabilistic distribution, to an orange color in the neighborhood scene; and so on.

In various embodiments, recoloring processes generate a wide array of color variations from a single source color palette for use with graphics through the use of a stochastic color mapping technique. Recoloring processes according to some embodiments allow for a wider range of color variations to be generated while ensuring that the colors harmonize with an overall design or theme. In some embodiments, stochastic color mapping processes operate using a minimum-cost maximum-flow (min-cost, max-flow) process and/or flow-optimization problem to generate color distribution mappings from a target graphic and a source color palette. The distribution mappings are then used as sampling probabilities for generating a large number of color palette mappings.

For example, the stochastic color mapping process determines the color mapping by modelling differences between the target color palette and the source color palette as a min-cost, max-flow or flow-optimization problem. For instance, the graphics editor models the target color palette and the associated densities of its colors as a target color distribution. Similarly, the graphics editor models the source color palette and the associated densities of its colors as a source color distribution. The flow-optimization problem involves determining how to change the source color distribution into the target color distribution. In the flow-optimization problem, changing the source color distribution into the target color distribution involves modeling a movement of a certain amount of mass (i.e., color) along a distance between a first point in a color space, such as a first set of color values, and a second point in the color space, such as a second set of color space values. The modeled "mass" is referred to as a "mapping" or "flow" between a first color, which is defined by the first set of color space values, and a second color, which is defined by the second set of color space values. The stochastic color mapping uses the color distribution mapping as a random probability distribution to select colors from the source color palette to replace colors of the target graphic.

In some embodiments, the stochastic color mapping process uses a stochastic earth mover distance (EMD) process to sample a wide array of color palettes from a single source (e.g., source graphic, source color palette, text input prompt, etc.). The EMD process operates to solve the flow-optimization problem by minimizing, subject to certain constraints, an earth-mover distance, where the earth-mover distance is an amount of work (i.e., a sum of products of the flows and distances between the source and target color distributions) involved in changing the source color distribution into the target color distribution. The stochastic color mapping process determines a probability distribution based on a flow or mapping between the source color distribution and the target color distribution that minimize the earth-mover distance without violating the constraints. The resulting probability distribution is used by the graphics editor to recolor the target graphic.

In some embodiments, an EMD value for a color is used as a probability for selecting the color. For example, an EMD mapping for a color set C may be determined as 0.8 for $C_1$ and 0.2 for $C_2$. The EMD mapping values are used as a transition probability factor, for instance, an 80% chance of exchanging a source color with $C_1$ and a 20% chance of exchanging the source color with $C_2$. During the recoloring process, a target color is exchanged with $C_1$ or $C_2$ based on the probability factor (e.g., $C_1$ is selected 80% of the time and $C_2$ is selected 20% of the time).

In some embodiments, the recoloring process implements a clustering process to cluster vector graphic colors in a color space, such as the hue, saturation, and lightness (HSL) space based on one or more color properties, such as hue or lightness. Color clustering includes grouping the extracted target graphic colors into clusters based on the one or more color properties. Once all of the colors have been assigned to a cluster, the colors in each cluster are reduced to a single color that is an average of all of the colors in the cluster. The clustering process creates a clustered color palette. The stochastic color mapping process receives the clustered color palette as input and generates one or more clustered destination color palettes by mapping the colors of a source color palette to the colors of the clustered color palette.

Once the clustered colors have been mapped, a de-clustering process is implemented to de-cluster the mapped colors to generate a destination color palette that is used to recolor the target graphic. The destination color palette includes a greater number of colors compared with the clustered color palette, while maintaining certain color property relationships, for example, hue and contrast relationships, present in the original colors from the target graphic. The de-clustering process is used to restore the original colors in the vector graphic after the clusters have been mapped using the stochastic color mapping process. De-clustering operates to maintain the original hue and contrast relationships present in the original colors of the target graphic. Maintaining color relationships in the recolored target graphics via de-clustering facilitates improved continuity and aesthetic properties in recolored graphics. The de-clustered colors are applied to the target graphic.

In some embodiments, color palettes used in stochastic color mapping color transfers are extracted from a vector target graphic or graphic. For instance, a vector target graphic can have path data identifying shapes and colors. Extracting a target color palette from the target vector image involves, among other steps, determining a shape from the path data, identifying the target color that is associated with the shape via the path data, and computing a respective weight for the target color within the target color palette based on the shape, area, location, etc. For instance, a palette-extraction process could iterate through each shape in a target vector image. If a given shape has not been encountered in a previous iteration, the shape's color is added to the target color palette and a weight of the color is added to the target color palette based on how much of the target vector graphic is occupied by the shape under consideration. If the shape has been encountered in a previous iteration, the weight of the color within the target color palette may be increased based on how much of the target vector graphic is occupied by the shape under consideration (i.e., the weight of the shape is added to the total weight for the corresponding color). The extracted target color palette, as well as one or more source color palettes, can be used to compute one or more stochastic color mappings.

In various embodiments, a workflow for performing stochastic color mapping color transfers is provided. For instance, a recoloring tool of a graphics manipulation application retrieves a target graphic and a source color palette.

In some embodiments, the target graphic and/or the source color palette are generated using text-to-image processes. For example, the recoloring tool (or other component of the graphics manipulation application) generates a target graphic based on a text prompt entered by a user, such as through a text-to-image diffusion model tool. In another example, a source graphic or source color palette is generated based on a text prompt. In one embodiment, a source graphic is generated (or selected from a library of source graphics) based on a text prompt, and the source color palette is computed by extracting colors from the source graphic. In another embodiment, the source color palette is generated (or selected from a library of source color palettes) directly based on the text prompt. The workflow uses a particular stochastic color mapping for a corresponding source color palette to generate one or more previews of a recolored target graphic, to perform a recoloring operation, or both. The recolored target graphics of the preview of the recoloring operation are generated by changing color information in the target graphic into color information from the source color palette.

In some embodiments, the workflow includes a color clustering process that operates to group colors according to at least one color property. In one example, color clustering is based on grouping colors in the hue, saturation, and lightness (HSL) space based on their HSL components. The coloring clustering process creates a subset of the colors of a color palette, such as a target color palette or a source color palette. The subset allows stochastic color mapping to operate on a smaller set of colors, which enables the recoloring process to run in an efficient time frame, such as on a millisecond time scale on consumer computer hardware. In some embodiments, the color clustering process accesses a color set, such as all of the colors extracted from a graphic, and segments the color set into clusters based on one or more color properties, such as hue and/or lightness. The clusters are reduced to one color by averaging the colors in the cluster and/or averaging one or more color properties of the colors in the cluster to generate a clustered color palette. The clustered color palette is accessed by the stochastic color mapping process to generate one or more clustered destination color palettes that will be used to recolor a target graphic.

In various embodiments, the workflow includes a color de-clustering process that operates to de-cluster the colors in the clustered destination palettes to generate corresponding de-clustered destination color palettes. In some embodiments, the de-clustered destination color palettes includes a same number of colors as the target color palette extracted from the target graphic. The de-clustering process is used to restore the original colors in the vector graphic after the cluster has been mapped using the stochastic color mapping process. De-clustering operates to maintain certain color property relationships, for example, hue and contrast relationships, present in the original colors from the target graphic. Maintaining color relationships in the recolored target graphics facilitates improved continuity and aesthetic properties in recolored images (e.g., reducing or even completely reducing jarring or clashing recoloring affects).

For example, the clustering/de-clustering process can maintain a hue and/or lightness ratio, difference, etc. between two colors. In one example, a target graphic includes a first object colored with a first color having a hue value (for instance, in the HSL space) of 100 and a second object colored with a second color having a hue value of 200, resulting in a hue difference of 200−100=100. In this example, the first object and the second object are recolored with different colors, but with the same (or similar) hue difference of 100 (e.g., a color replacing the first color has a hue value of 150 and a color replacing the second color has a hue value of 250).

In another example, two objects of a target graphic have colors A (with hue Ah) and B (with hue Bh), which both become assigned to the same cluster during the clustering process. The resultant cluster will have representative color C (with hue Ch, which is the average of all of the colors in the cluster). During recoloring, C is processed according to various embodiments to color C', with a hue that is additive, no changes for saturation, and for lightness, the relationship is multiplicative. For instance, if C' becomes C/2, lightness for cluster colors also becomes half (color/2).

The embodiments provide several advantages and benefits relative to conventional image recoloring techniques. For example, conventional image recoloring techniques suffer from at least the following key challenges: (1) requirement of manual manipulation of some or all image elements in order to recolor a graphic, (2) inaesthetic, disjointed, and/or clashing color palette generation, and (3) limited number of color palettes.

With respect to the first challenge, embodiments implement a recoloring process configured to automatically generate a plurality of color palettes based on user input. For instance, a user can input a target graphic (via text prompt or uploading an image) and a desired color palette (also via text prompt or selecting an image or color palette) and the recoloring process will automatically generate one or more recolored target graphics. The recoloring process is automated through a recoloring engine operative to extract a set of target colors from a target graphic, cluster the set of target colors, perform a stochastic color mapping process on the clustered colors, and de-cluster the mapped colors for use as a color palette to generate a plurality of recolored images. In some embodiments, the recoloring process can generate a plurality of recolored images, each recolored using a different color palette, with each iteration of the recoloring process.

With respect to the second challenge, embodiments implement a flow-based minimum-cost maximum-flow process that operates to generate a replacement color palette that is more aesthetically related to the original color palette, for instance, compared with a direct color replacement process (e.g., directly replacing "blues" with "greens," etc.). In some embodiments, the flow-based minimum-cost maximum-flow process includes a stochastic EMD-based process. Using an EMD-based process can result in improved coherence being maintained after a color transfer, and can also add robustness in cases where there is a large difference between the distribution of colors between a source color palette and a target graphic. Thus, certain embodiments using this type of mapping computation can generate recolored target graphics that have a high aesthetic quality. In addition, embodiments implement a clustering/de-clustering process operative to group and manipulate colors with similar color properties to maintain color relationships between exchanged colors. For example, maintaining original hue and contrast relationships in the colors in the new source color palette that correspond to relationships in the original color set. Maintaining the color relationships according to some embodiments preserves a similar aesthetic, color balance, etc. in the recolored graphics while allowing the target graphic to be modified with a new set of colors, avoiding the introduction of jarring or clashing color schemes. As a result, recoloring processes according to some embodiments facilitate recoloring results that are more design-intuitive, harmonious, and aesthetically pleasing compared with recolored graphics generated using existing methods.

With respect to the third challenge, embodiments implement a stochastic color mapping configured to provide a wide array of variations in the recoloring results. For example, in some embodiments, stochastic color mapping is a probabilistic EMD-based process operative to find a mapping between the colors in the source and target graphics based on transition probabilities of the source color palette and target color palette. For instance, recoloring processes can present a user with a set of modified target graphics recolored using color palettes determined based on color transition probabilities (instead of, as with conventional techniques, one optimal solution or a direct color exchange process), generating target graphics with unique color combinations and recoloring configurations. The color palettes are randomly generated, but within certain color relationships controls through the use of an EMD process to determine color distributions that are employed in determining color transfer probabilities. Accordingly, due to the probabilistic and randomized configuration of the stochastic color mapping process, different outputs (destination color palettes) are generated based on the same input (target graphic and source color palette).

In some embodiments, a stochastic palette flow is computed that maps colors of the source color palette to colors of a target color palette of the target graphic. To modify the target graphic, each color from the target graphic is mapped, via stochastic color mapping, to a modified (or destination) target color using color information of the source color palette. For instance, the stochastic color mapping is a palette flow computed by finding a set of flows between the colors of the source color palette and a target color of the target color palette that minimizes an EMD between a target color distribution of the target graphic and a source color distribution of the source color palette. In some embodiments, a randomization factor is introduced to facilitate further randomization, for example, by giving a minimum none-zero probability to all target states of the stochastic EMD computation.

In a recoloring operation using a modified target color, the modified target color is computed via the stochastic color mapping process from a probability function of a weighted combination of source colors from the source color palette. In one example, the set of weights in this weighted combination is the set of flows between the colors of the source color palette and the target color. In another example, the set of weights in this weighted combination is a normalized version of the set of flows between the colors of the source color palette and the target color. A modification to the target graphic is performed by recoloring an object in the target color with the modified target color.

Conventional EMD processes only provide for one optimal mapping from a source to a target. Accordingly, conventional EMD calculations are very limiting for image recoloring because only a single output (a recolored target graphic) is generated for each input (e.g., a target graphic and source graphic or color palette). Recoloring processes according to some embodiments use a stochastic EMD process that determines computed distributions for use as sampling probabilities for color mappings. These mappings are then applied to the target graphic to generate multiple color variations. The probabilistic nature of the stochastic color mapping process facilitates the generation of a wide array (e.g., a potentially infinite number) of different and aesthetically pleasing color palettes for recoloring a target graphic. Stochastic color mapping provides flow-control or EMD-based palette computation that can sample a wide array of color palettes from a single source color palette and target color palette (i.e., the same input can generate a wide array of outputs).

For example, in a conventional EMD process, a single recolored image is generated for a target graphic based on a source graphic (or source color palette). The same single recolored image is generated each time the recoloring function is executed. In a stochastic color mapping process, a set of multiple unique recolored images are generated for the target graphic based on the source graphic. In addition, different unique recolored images can be generated each time the target graphic is processed with the source graphic using the stochastic color mapping process, for example, a designer can run the process again to generate a new set of unique recolored images with the same or different parameters (e.g., input prompts, color specifications, color theory settings, etc.).

For instance, using a graphical user interface (GUI) of a recoloring system according to some embodiments, a designer or other user can input a text prompt (e.g., "vase with flowers") to generate a target graphic and another text prompt for a color theme (e.g., "pastels"). The recoloring system can present multiple versions or previews of the target graphic colored/recolored based on the color theme on the GUI. For example, four different previews of a "vase with flowers" graphic can be presented that are colored/recolored using different variations of a "pastel" color palette generated by the stochastic color mapping process. Each of the previews are different, but related with similar color palettes and color property relationships. The user can invoke the recoloring process multiple times to receive a different set of previews colored with a variation of the "pastel" color palette. The user can select one or more of the previews to generate a recolored graphic.

FIG. 1 illustrates a recoloring system 100 according to one embodiment. The recoloring system 100 is suitable for implementing a novel stochastic recoloring process according to some embodiments.

The recoloring system 100 includes a user interface engine 102 which presents a user interface (e.g., GUI, etc.) to a user, such as a designer or other operator. For example, a user interacts with a user interface of the recoloring system 100 via user interface engine 102 to provide the user input 110 to the recoloring system 100. The user input 110 specifies target information indicating a target graphic to be recolored (e.g., the graphic input 111) and a color palette for use in recoloring the target (e.g., source input 112). For example, the user input 110 includes graphic input 111 providing, specifying, describing, or otherwise indicating the target graphic or image. In another example, the user input 110 includes source input 112 providing, specifying, describing, or otherwise indicating the source theme, color palette, graphic, image, etc. (the "source graphic" or "source color palette") to use as the source for recoloring the target graphic.

The user input 110 is provided to the recoloring engine 104. In some embodiments, the recoloring engine 104 includes an input information processing engine 106 to process various aspects of the user input 110, including, for example, data or file conversions, data or file storage, color extractions, text-to-input processing, graphic creation and/or selection, color palette creation and/or selection, etc.

In some embodiments, the graphic input 111 is input directly by the user. For example, the graphic input 111 is a graphic uploaded, selected, or otherwise provided to the recoloring system 100 via the user interface engine 102. In this example, the user inputs a specific file into the recoloring system for use as the target graphic. In another example, the graphic input 111 is a user selection of one or more graphic assets or color palettes stored in a library 170 of the recoloring system 100 and presented on a user interface through the user interface engine 102. In this example, the user interface engine 102 presents the user with one or more sample assets determined based on one or more factors, including, without limitation, text input, user history, a project theme (e.g., a project to contain the target graphic), etc. The user selects one of the one or more sample graphics for use as the target graphic.

In some embodiments, the library 170 stores graphics, graphic files, etc. in a data store accessible by the recoloring engine 104. In various embodiments, the library 170 includes remote networked data storage resources located external to the recoloring system 100, such as a graphics storage accessible via the internet.

In some embodiments, the graphic input 111 is input indirectly by the user, for example, via a text prompt describing or indicating a target graphic or theme. The recoloring engine 104 creates one or more target graphics based on the text prompt or locates one or more target graphics in the library 170 based on the text prompt. For example, a user seeking to work with a certain target graphic or theme can enter a text prompt describing or defining the desired graphic or components thereof (e.g., "forest cabin"). The input information processing engine 106 includes a text-to-image (or text-to-graphic) tool operative to create, or locate in the library 170 of graphics, one or more sample graphics associated with the text input (e.g., various graphics that include a forest cabin). For example, the text-to-image tool creates, or locate in the library 170 of graphics, one or more sample images of a vase with flowers responsive to entry of a "vase with flowers" text prompt by the user. The user selects one of the one or more sample graphics for use as the target graphic.

The text-to-image tool includes a computational model that receives natural language as input and provides one or more sample graphics corresponding to the natural language content. In some embodiments, the text-to-image tool creates the one or more sample graphics, for instance, using an artificial intelligence (AI) and/or machine learning (ML) drawing tool capable of creating graphics based on natural language descriptions. In various embodiments, the text-to-image tool searches a graphics database (e.g., library 170) to locate existing graphics having content that corresponds with natural language descriptions.

In some embodiments, the text-to-image tool operates using one or more computational models, such as an AI or ML model, trained to receive natural language input and to output an image associated with the input (either via creation of a new image or retrieval of an existing image). Non-limiting examples of text-to-image tool computational models include a text-to-image diffusion model and a text-to-image generative adversarial networks (GANs).

In some embodiments, the source input 112 is input directly by the user. For example, the source input 112 is a graphic uploaded, selected, or otherwise provided to the recoloring system 100 via the user interface engine 102. In this example, the user inputs a specific file into the recoloring system 100 for use as the source color palette. For instance, the user uploads a graphic file with a color theme that the user desires to use to recolor the target graphic. In some embodiments, the source input 112 is a user selection of one or more graphics or color palettes stored in a library 170 of the recoloring system 100 and presented on a user interface through the user interface engine 102. In this example, the user interface engine 102 presents the user with one or more sample graphics and/or color palettes determined based on one or more factors, including, without limitation, text input, user history, a project theme (e.g., a project to contain the target graphic), etc. The user selects one of the one or more sample graphics and/or color palettes for use as the source color palette.

In some embodiments, the source input 112 is input indirectly by the user, for example, via a text prompt describing or indicating a source color palette theme. The recoloring engine 104 creates one or more sample graphics or color palettes based on the text prompt or locates one or more sample graphics or color palettes in the library 170 based on the text prompt. For example, a user seeking to recolor a target graphic using a certain graphic color scheme or color theme can enter a text prompt describing or defining the desired graphic or components thereof (e.g., "neon spray paint"). The text-to-image tool of the input information processing engine 106 creates, or locates in the library 170 of graphics, one or more sample graphics associated with the text input (e.g., various graphics or color palettes relating to the term "neon spray paint"). The user selects one of the one or more sample graphics or color palettes for use as the source color palette.

The recoloring engine 104 is configured to operate using various graphic or image file types. In some embodiments, recoloring engine 104 operates using vector graphics. In general, a vector graphic is a computer graphic created using a sequence of commands and/or mathematical statements that define lines, curves, and shapes, in a two-dimensional or three-dimensional space. Non-limiting examples of vector graphic file types include *.ai, *.cdr, *eps, *.pdf, and *.svg. In various embodiments, recoloring engine 104 operates using a non-vector graphic, such as a raster graphic. In general, a raster image is a computer image defined based on pixels or other single points of color. Non-limiting examples of raster graphics file types include *.pg, *.gif, *.png, *.tif, *.bmp, *.jpg, and *.psd. In some embodiments, the input information processing engine 106 converts file types into a certain format for processing. For example, raster images input by users are converted to vector graphics and vice versa. Although vector graphics are used in some examples in the present disclosure, embodiments are not limited to vector graphics, as recoloring processes and components thereof are capable of operating using different graphic types, such as raster graphics.

The recoloring engine 104 is configured to operate using various types of color information. For example, the recoloring engine operates using red, blue, green (RGB) color information; cyan, magenta, yellow, and key (CMYK) color information; hexadecimal ("hex") color information; HSL color information; CIELAB (or l*a*b*) color information; combinations thereof; variations thereof; etc. The input information processing engine 106 is configured to convert color information between different types. For example, the recoloring engine 104 uses HSL color information for certain portions of the recoloring process, such as clustering, mapping, and de-clustering. The input information processing engine 106 converts a target graphic provided by the user in a first, non-HSL format to the HSL format. In general, HSL models represent colors as three values: hue, saturation percentage, and lightness percentage. Hue is a degree on a color wheel, according to color theory, having a value from 0 to 360 (e.g., relating to degrees on the circle of the color wheel); saturation ranges from 0% (shade of gray) to 100%

(full color); and lightness ranges from 0% (black) to 100% (white). For example, the color "navy blue" has an HSL value of (240, 100, 25) (the corresponding hex code is #000080 and the corresponding RGB value is (0, 0, 50)).

In various examples, colors are manipulated within the recoloring engine 104 based on the HSL and/or l*a*b* color space. HSL and l*a*b* are used as non-limiting examples within the present disclosure. In general, the choice of using HSL color space over other color spaces, such as the RGB color space, is based on the perceptual meaning assigned to hue, saturation, and lightness in HSL, for instance, that better represents shades and tints, providing a more accurate and meaningful clustering of colors.

Once a target graphic has been selected by the user, the input information processing engine 106 performs a color extraction process to obtain the colors of the target graphic. The colors of the target graphic are extracted into a target graphic set or target color palette (e.g., the color set or palette to be recolored). In one example, for a target vector graphic, input information processing engine 106 accesses the target vector graphic and determines shapes and colors from the path data of the target vector graphic. For instance, the input information processing engine 106 can access one or more path objects from a target vector graphic. The input information processing engine 106 can obtain shape data from a path object. Examples of this shape data include a shape type (e.g., circle, rectangle, etc.), key points of the shape (e.g., a center of a circle, vertices of a rectangle), information about line or curve lengths (e.g., a circle radius), location information, etc. The input information processing engine 106 can identify various shapes within a vector graphic based on the accessed shape data. The input information processing engine 106 can reference various color parameters (e.g., stroke color, fill color, color properties, etc.) to identify or derive color information for each shape as rendered. In one example, the input information processing engine 106 can identify the color of a shape having a solid color by referencing a fill color. In another example, the input information processing engine 106 can derive one or more colors of a shape having a shading construct by referencing various parameters of the shading construct (e.g., stop colors) and computing the resulting color information that would be displayed in the rendered vector graphic.

In addition to determining the color of shapes of the target graphic, the input information processing engine 106 determines a weight for each target color. For instance, the input information processing engine 106 can determine, from the path data and the shape data, how much of a vector graphic, as rendered, would be occupied by one or more shapes with a given color (shape or shape area). For instance, the color extraction process can determine, from the path data and the shape data, how much of a vector image, as rendered, would be occupied by one or more shapes with a given color. An increase in how much (e.g., based on area, pixels, etc.) of a vector image, as rendered, is occupied by one or more shapes with a particular color can correspond to an increased weight for that particular color. A decrease in how much of a vector graphic, as rendered, is occupied by one or more shapes with a particular color can correspond to a decreased weight for that particular color. The color extraction process is for illustrative purposes as target colors and/or color weights can be determined based on other processes.

The color extraction process generates a target color set 120 that includes the colors of the target graphic with corresponding weights. The weights can be assigned based on various processes. In one example, the weight of a color is assigned based on the area occupied by the color. For instance, the total color weight for a graphic is specified as a numerical value, such as 1.0, 100%, 100 or some other similar value. Each color is assigned a weight based on how much of the graphic (based on area, pixels, etc.) is occupied by the color. For instance, a first color occupying 5% of the area (or pixels) of a graphic is assigned a weight of 0.05 (on a 1.0 scale), a second color occupying 20% of the area of a graphic is assigned a weight of 0.20, and so on. In one example, the weights are determined or modified based on user input, such as via a weight-modification user interface element. In another example, the weight of a color is assigned or modified based on the importance (for instance, as an object of interest) of the object occupied by the color. For instance, the weight of a foreground object is scored higher compared with the weight of a background object. For example, a first color assigned the weight of 0.05 based on area is a foreground object and, as a result, the weight is increased (e.g., multiplied or increased by an importance or foreground factor) to 0.20 and a second color assigned the weight of 0.20 is a background object and, as a result, the weight is decreased by a factor, for example, to 0.10.

In some embodiments, the input information processing engine 106 includes a weighting computational model configured to weight objects, for example, based on their importance in the image. The weighting computational model includes an AI/ML model trained to receive an image as input and to rank the importance of objects and assign color weights (or modify existing color weights determined based on area or pixels) based on the importance rank. For example, the weighting computational model receives a target image of a ship in the harbor as input and generates weights in which the boat is ranked higher than the water and shoreline in the target image.

In an embodiment in which the source input 112 is a source graphic or text input that is converted into a source graphic, the input information processing engine 106 performs the color extraction process on the source graphic to determine a weighted source color palette 116.

In some embodiments, the target color set 120 is subject to processing via a palette processing engine 108 (see, for example, FIGS. 2 and 3) to generate a modified target color set 122. The palette processing engine 108 clusters and de-clusters sets or palettes of colors. In various embodiments, the modified target set 122 includes a clustered target color palette (see, for example, FIGS. 2 and 3).

A destination palette engine 110 is configured to create a destination color palette for recoloring the target graphic. In an embodiment in which the target color set 120 is not clustered, the colors provided to the destination color palette engine 140 are the full target color set 120 extracted from the target graphic. In an embodiment in which the target color set 120 is clustered, a modified (i.e., clustered) target set 122 is provided to the destination color palette engine 140. The source color palette 116 is also provided to the destination color palette engine 140. The destination color palette engine 140 performs the stochastic color mapping process to generate one or more destination color palettes 124. In various embodiments, the destination color palette engine 140 generates about 4-100 destination color palettes. In some embodiments, for example, in which the modified target set 122 was a clustered target color palette, the destination color palettes 124 are provided to the palette processing engine 108 to generate de-clustered destination color palettes 126 (see, for example, FIGS. 2 and 3).

Figure 8:
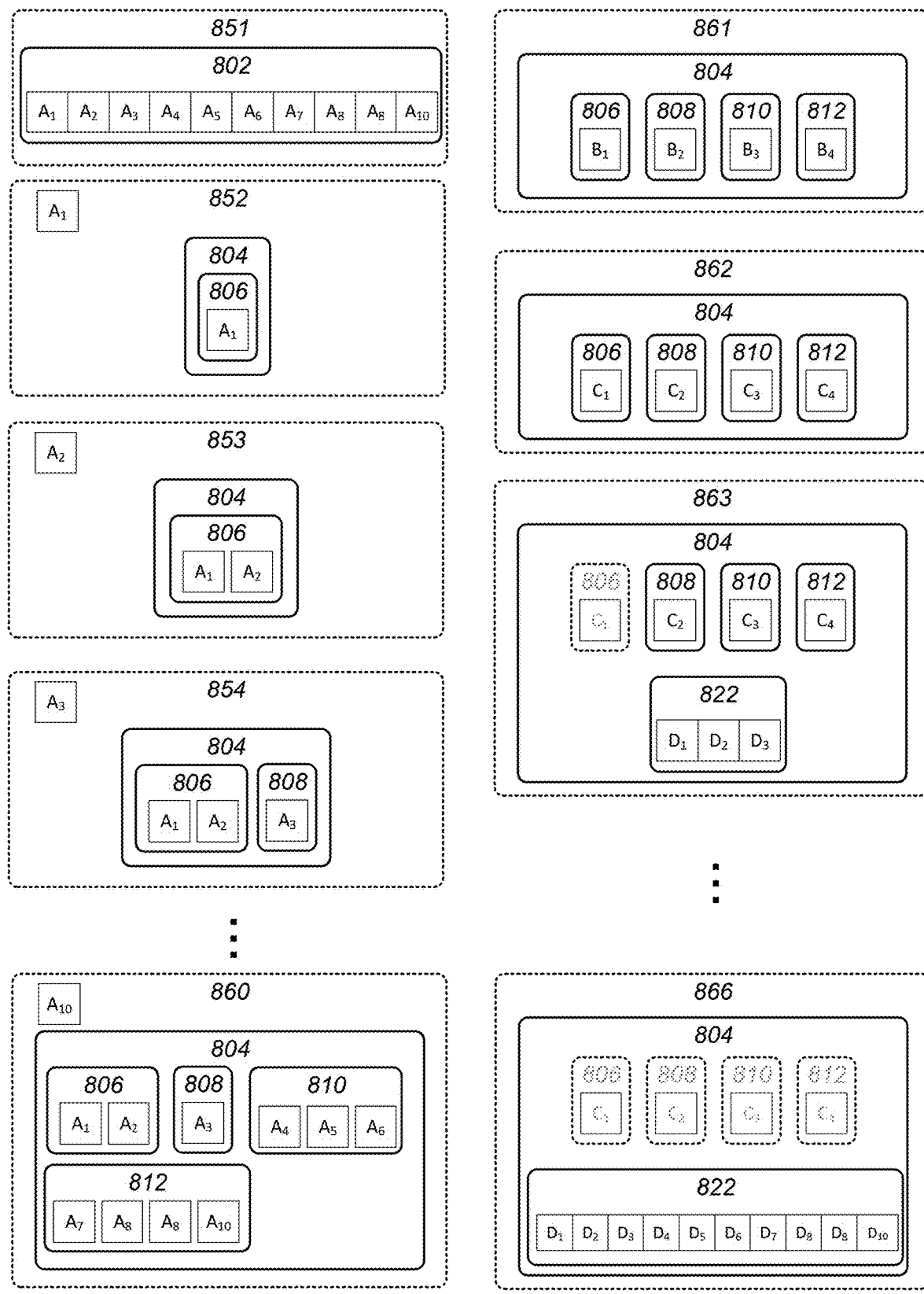
FIG. 8 illustrates a block diagram of a process for generating a destination color palette according to one embodiment.

In various embodiments, the de-clustered destination color palettes 126 (or the destination color palettes 124 if the non-clustered target color set 120 was provided to the destination color palette engine 140) are provided to an image recoloring engine 132 to generate one or more recolored target graphics 128 modified using the destination color palettes 126 (or palettes 124 if the non-clustered target color palettes 120 were provided to the destination color palette engine 140) (see, for example, FIGS. 8-10). The recoloring engine 104 provides the recolored target graphics 128 to the user interface engine 102 for display to a user.

The destination color palette engine 140 performs the stochastic color mapping process using a minimum-cost maximum-flow (min-cost, max-flow) process to generate color distribution mappings from the source color palette 116 to the target color set 120 (or 122, if clustered). The distribution mappings are then used as sampling probabilities for generating a large number of color palette mappings. In some embodiments, the stochastic color mapping process is a modified EMD process configured to utilize the distribution mapping, min-cost, and max-flow output of EMD with a random probability distribution to eliminate the deterministic results typically produced by conventional EMD-based computations, for instance, which typically provide only a single, optimal result.

Accordingly, in some embodiments, the stochastic color mapping process is a probabilistic EMD (pEMD process). In various embodiments, the pEMD process is a randomized pEMD process (ϵ-pEMD) in which the pEMD process is modified by a uniform randomness factor (ϵ) to further introduce randomness into the destination color palette creation process.

In general, EMD is a dissimilarity measure between two probability distributions over a region. Given two distributions, x and y (for instance, x is a source color s and y is a target color t), a flow between them (for instance, converting t to s) is any matrix F that defines a weight distribution among x and y. In general, x is the distribution of colors in the source color palette, and y is the distribution of colors in the target color palette. Each point in the matrix F, $f_{ij}$, represents the amount of weight at $x_i$ matched to $y_i$. The work done by a feasible flow in matching x and y is the amount of matched weight, multiplied by the distance, for each point in x and y as shown in the following Equation (1):

$$\text{WORK}(F, x, y) = \sum_{i=1}^{m}\sum_{j=1}^{n} f_{ij} d_{ij}.$$

The EMD is the minimum amount of work to match x and y, normalized by the total weight of the (lighter) distribution. The optimization problem is finding the flow that minimizes the work. The work is divided by the total weight of one distribution as shown in the following Equation (2):

$$EMD(x, y) = \frac{\min_{F=(f_{ij})\in\mathcal{F}=(x,y)} \text{WORK}(F, x, y)}{\min(\omega_\Sigma, u_\Sigma)}.$$

In some embodiments, minimizing the EMD involves minimizing an objective function. For example, the source and target color palettes each include a set of colors that occur within a source graphic (or color palette) and target graphic, respectively, along with weights indicating respective densities of the colors within the color palette (e.g., how much of the graphic includes content having a particular color). The destination color palette engine 140 can compute a total target weight that is a sum of weights of the colors in the target color palette or set (whether clustered or not clustered). The destination color palette engine 140 can also compute a total source weight that is a sum of weights of the colors in the source color palette. The destination color palette engine 140 can select a total flow or mapping constraint that is a minimum of the total target weight and the total source weight.

Continuing with this example, the destination color palette engine 140 can access an objective function. The objective function includes a weighted summation of distances with respect to the colors of the target color palette and the colors of the source color palette, where the distances are weighed by flows with respect to the colors of the target color palette and the colors of the source color palette. For instance, each term of the weighted summation could include a distance (or cost) that is weighted with a flow, where the distance is a distance between a pair of colors from the target color palette and the source color palette and the flow is a flow between that pair of colors.

In this example, the destination color palette engine 140 can determine, subject to a set of constraints, the flows that minimize the objective function. The set of constraints can include the sum of flows for the target color in the target color palette being less than or equal to the weight of the target color in the target color distribution. The set of constraints can also include the sum of flows for the source color in the source color palette being less than or equal to the weight of the source color in the source color distribution. The set of constraints can also include the sum of the flows with respect to the colors of the target color palette and the colors of the source color palette being equal to the total flow constraint.

In one example of the embodiment discussed above, $C_T$ and $C_S$ are weighted color distributions of a target graphic and a source graphic (or color palette), respectively. In this example, $C_T$ has m colors with $$C_T = \left(C_{T_1}; w_{C_{T_1}}\right), \left(C_{T_2}; w_{C_{T_2}}\right) \ldots \left(C_{T_m}; w_{C_{T_m}}\right),$$

where $C_{T_i}$ is the ith color and $w_{C_{T_i}}$ is the weight of the ith color. Similarly, $C_S$ has n colors with $$C_S = \left(C_{S_1}; w_{C_{S_1}}\right), \left(C_{T_2}; w_{C_{S_2}}\right) \ldots \left(C_{S_n}; w_{C_{S_n}}\right),$$

where $C_{S_j}$ is the jth color and $w_{S_{C_j}}$ is the weight of the jth color. In some embodiments, m=n; in other embodiments, m>0 and n>0. The ground distance between $C_T$ and $C_S$ is $$D = \left[d_{C_T, C_{S_j}}\right].$$

The destination color palette engine 140 computes a palette flow $F=[f_{i,j}]$, where $f_{i,j}$ is a flow or mapping between target color $C_{T_i}$ and source color $C_{S_j}$.

Continuing with this example, the destination color palette engine 140 computes an EMD palette flow that minimizes a cost. For instance, the destination color palette engine 140 accesses the objective function in the following Equation (3):

$$\sum_{i=1}^{m}\sum_{j=1}^{n} f_{C_{T_i},C_{S_j}} d_{C_{T_i},C_{S_j}}.$$

The destination color palette engine 140 computes flows (i.e., $$f_{C_{T_i},C_{S_j}}$$

for i=1 ... m and j=1 ... n) that minimize this objective function subject to a set of constraints. One of these constraints is represented by the following Equation (4):

$$f_{C_{T_i},C_{S_j}} \geq 0, 1 \leq i \leq m, 1 \leq j \leq n.$$

The constraint of Equation (4) requires each flow from a target color to a source color to have a value greater than 0.

Another constraint is represented by the following Equation (5):

$$\sum_{i=1}^{m} f_{C_{T_i},C_{S_j}} \leq w_{C_{T_i}}, 1 \leq i \leq m.$$

The constraint of Equation (5) requires a sum of flows for a given target color i to be less than a weight for that target color i.

Another constraint is represented by the following Equation (6):

$$\sum_{j=1}^{n} f_{C_{T_i},C_{S_j}} \leq w_{C_{S_j}}, 1 \leq j \leq n.$$

This constraint requires that a sum of flows for a given source color j to be less than a weight for that source color j.

Another constraint is represented by the following Equation (7):

$$\sum_{i=1}^{m}\sum_{j=1}^{n} f_{C_{T_i},C_{S_j}} = \min\left\{\sum_{i=1}^{m} w_{C_{T_i}}, \sum_{j=1}^{n} w_{C_{S_j}}\right\}.$$

The total flow constraint of Equation (7) requires that the sum of all of the flows must be equal to a minimum of a total target weight and a total source weight, where a total target weight $$\sum_{i=1}^{m} w_{C_{T_i}}$$

is a sum of the weights of the target colors in the target color palette and a total source weight $$\sum_{j=1}^{n} w_{C_{S_j}}$$

is a sum of the weights of the source colors in the source color palette.

In some embodiments, for determining the EMD of a pEMD or ε-pEMD process, a palette flow F is computed by solving this linear optimization problem. The EMD is defined as the work normalized by the total flow, as represented in the following Equation (8):

$$EMD(P, Q) = \frac{\sum_{i=1}^{m}\sum_{j=1}^{n} f_{C_{T_i},C_{S_j}} d_{C_{T_i},C_{S_j}}}{\sum_{i=1}^{m}\sum_{j=1}^{n} f_{C_{T_i},C_{S_j}}}.$$

In some embodiments, solving the linear optimization problem involves computing one or more sets of flows or mappings between the colors of the source color palette and one or more target color of the target color palette that minimize the EMD. For instance, for a given target color i, a set of flows between each of source color j in the source color palette is computed that causes the EMD to be minimized. This set of flows is used as a probability distribution for use by the stochastic color mapping process according to some embodiments, as described further below.

In some embodiments, the stochastic color mapping process may use a stochastic or probabilistic EMD (pEMD) process. For example, s and t are two discrete random variables defined on a source S (e.g., source color palette) space and a target T (e.g., target color palette) space, and P(S) and P(T) are the respective probability distributions. In various embodiments, EMD(s, t) is the L2 Norm in CIELAB space. For example, in EMD, a metric of distance (or weight) is provided for any two entities, accordingly, EMD (s, t) being the L2 Norm in CIELAB space, indicates that colors are converted to CIELAB space for distance computations (e.g., the distance between two colors is the distance between the colors in the CIELAB space).

Solving an EMD optimal transport problem operates to determine the minimum cost ω* to transport mass (or color) from one distribution (e.g., a source color distribution) to another distribution (e.g., a target color distribution) according to the following Equation (9):

$$\omega* = \operatorname{argmin}_\omega \sum_{s \in S, t \in T} \omega(s, t) \cdot EMD(s, t)$$

The ω* optimization represents a min-cost max-flow problem (for example, a classic combinatorial optimization problem in network flow theory), which can be solved by the successive shortest path algorithm, which fosters a simple implementation, for instance, a process with a complexity of $O(n^3 \log(n))$, where n=|S|+|T|.

The pEMD process uses the minimum cost ω* determined in Equation (9) to compute a transition probability (p or Pr). pEMD operates to generate practically limitless variations of harmonious color palettes for use in recoloring target graphics. The pEMD process can be formalized by a finite horizon discrete time Markov process, for instance, defined as a sequence of two variables $\{X_0, X_1\}$, where the random variable $X_0$ is defined on the discrete space S, and $X_1$ is defined on the discrete space T, respectively. In some embodiments, the transition probability is defined according to the process of the following Equation (10), with ω*(s, t) essentially being the EMD:

$$Pr(X_1 = t \mid X_2 = s) := \frac{\omega * (s, t)}{\sum_{s' \in S} \omega * (s', t)},$$

where s' is an element in S, and the denominator is the summation of weights of every element in S.

The transition probability is computed for replacing a target color t with a source color s having the probability Pr. Accordingly, a source color s is mapped to a target color t with a probability of Pr. With each iteration of the recoloring process (for instance, to create an initial set of sample recolored graphics or creating one or more new recolored graphics based on user input, such as a shuffle operation, color selector operation, etc. (see, for example, FIGS. 10A-10F)), a new set of colors are determined due to the probability Pr that is used to select the color mapping. As indicated in Equation (10), higher weighted colors (for instance, colors with a greater area in a graphic) have a higher probability Pr and, therefore, are more likely to be selected for a color mapping, and vice versa. In one example, if a color $s_1$ has a Pr of 0.5 (on a scale of 0.0-1.0) or 50% for replacing color $t_1$, then there is a 50% chance that $s_1$ replaces (or is mapped to) $t_1$ in a stochastic color mapping process.

In one example, for a color C, if the EMD mapping or EMD value is 0.8 for $C_1$ and 0.2 for $C_2$, conventional EMD methods would take weighted combination to determine a new color (or source color) for replacing a target color, such as the following: $(0.8*C_1)+(0.2*C_2)$. In some embodiments, the color mapping process selects between $C_1$ or $C_2$ based on the respective Pr values, specifically, a 0.8 and 0.2 probability (e.g., $C_1$ would be selected 80% of the time and $C_2$ would be selected 20% of the time). In contrast, in a conventional process, an EMD mapping (e.g., 0.8 for $C_1$ and 0.2 for $C_2$) would always derive the same replacement source colors. However, processes according to some embodiments can derive different replacement source colors with each iteration, based on a probabilistic selection of the replacement source color.

Color variations are generated by simulating the Markov chain indicated in Equation (10). For a source color s∈ S, a trajectory π starting from s generates the target color t. The lemma indicated in the subsequent Equation (11) follows, in which the average color assigned to a source color s is the optimal transport in the limit and where Π is a set of trajectories:

$$\lim_{|\Pi| \to \infty} \sum_{\pi \in \Pi} \frac{\pi(s)}{|\Pi|} := \omega * (s)$$

In some embodiments, the stochastic color mapping process is configured as a randomized stochastic color mapping process based on a variation of pEMD that integrates a randomness factor ε (ε-pEMD). In general, ε-pEMD facilitate further randomization by giving a minimum non-zero probability (i.e., ε) to all target states (e.g., modified target colors or destination colors). In various embodiments, ε-pEMD computes the transition probability according to the following Equation (12):

$$Pr(X_1 = t \mid X_2 = s) := \begin{cases} \frac{\epsilon}{|T|} + (1-\epsilon) \cdot \frac{\omega * (s, t)}{\sum_{s' \in S} \omega * (s', t)}, & \text{if } \omega * (s, t) \geq 0 \\ \frac{\epsilon}{|T|}, & \text{otherwise} \end{cases},$$

where ε∈ [0, 1] is the uniform randomness factor and |T| is the number of colors in set T. As ε tends towards zero, Equation (10) and Equation (12) converge, and as ε tends towards one, the transition probabilities become a uniform distribution. In some embodiments, ε is conditioned on the starting state s∈ S as indicated in the following Equation (13):

$$\epsilon(s) := \delta \cdot (1 - P(s)),$$

where δ is a small real number. In general, ε is selected or determined such that the trajectories from a color which has more significant weight adheres to the probability distribution of pEMD more faithfully than colors with less weight. The value of ε and/or δ are selected using various processes, such as random assignment, system (software) parameter settings, user preferences (including learning based on user selection), etc. In some embodiments, δ is set to 1.0. In various embodiments, δ is set to a value between 0.1 and 1.0.

Figure 2:
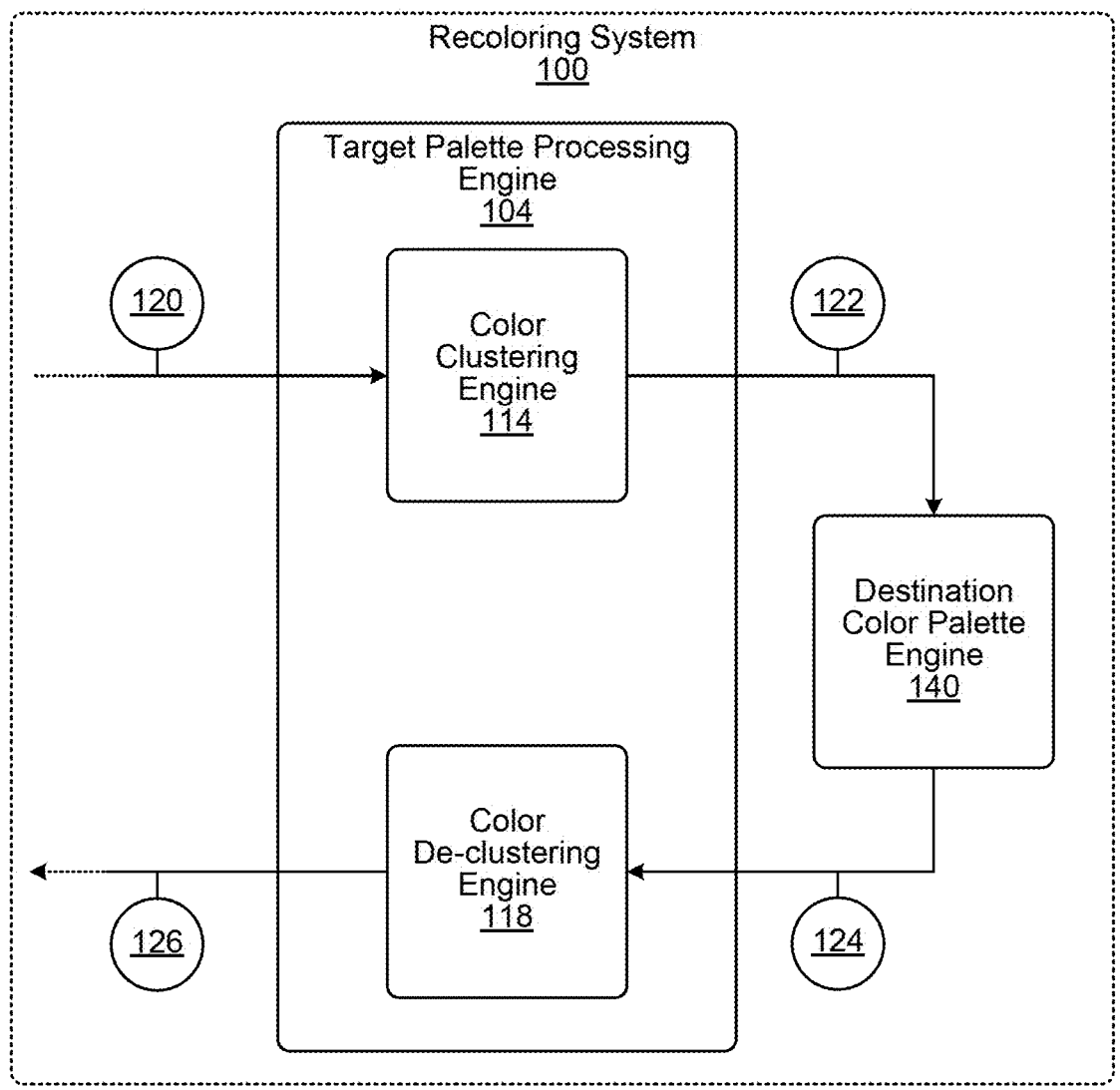
FIG. 2 illustrates a target palette processing engine according to one embodiment.

FIG. 2 illustrates the palette processing engine 108 according to one embodiment. The palette processing engine 108 is suitable for implementing a novel clustering process and de-clustering process according to some embodiments.

In some embodiments, the target color set 120 is received by the palette processing engine 108. In various embodiments, the target color set 120 includes a full set of colors extracted from a target graphic. In exemplary embodiments, the target color set 120 is represented using HSL values. In some embodiments, the target color set 120 is provided to a color clustering engine 114 configured to perform a color clustering process on the target color set 120. The color clustering process is operative to segment the colors of the target color set 120 into at least one cluster. The color clustering process segments or groups similar colors from a target color set 120 based on certain color properties, such as one or more of the HSL hue, saturation, and/or lightness values.

In various embodiments, the color clustering engine 114 initiates the color clustering process for the target color set 120 by initiating an empty set of clusters. For each color $A_i$ in the target color set 120 of colors $A_1$-$A_n$, the color clustering engine 114 compares the color $A_i$ to all colors $B_j$ in the active or present cluster. If one or more designated color properties of color $A_i$ are within a predefined threshold of color $B_j$, then color $A_i$ is added to the same cluster as color $B_j$; otherwise, a new cluster is initialized and color $A_i$ is added to the new cluster.

In various embodiments, a new color, such as $A_3$, is compared to the average of existing colors in the cluster for hue and/or lightness thresholds. In some embodiments, $A_i$ has to be within the predefined threshold for all compared color properties, such as hue and lightness, in order to be added to the active cluster. In various embodiments, only one color property must be within the predefined threshold (for example, if one of hue or lightness are within the predefined threshold, $A_i$ is added to the active cluster). In some embodiments, $A_i$ has to be within the predefined threshold of all colors in the active cluster in order to be added (for example, if $A_i$ is within the predefined threshold of $B_1$ but not $B_2$, then $A_i$ is not added to the active cluster). In various embodiments, $A_i$ can be within the predefined threshold of less than all of the colors in the active cluster. In one example, $A_i$ will be added to the active cluster if $A_i$ is within the predefined threshold of only one color in the active cluster. In another example, $A_i$ will be added to the active cluster if $A_i$ is within a certain number or percentage of colors in the active cluster (e.g., $A_i$ must match a minimum of 50% of the active cluster colors; $A_i$ must match a minimum of 2 colors if the cluster has greater than three colors; etc.).

The one or more color properties include various color characteristics, values, etc., depending on the color space used by the color clustering engine 114, including, without limitation, values of hue, saturation, lightness, red, green, blue, cyan, magenta, yellow, key, hexadecimal values, l*a*b* color information, and/or the like.

In one embodiment, the one or more color properties are HSL values. In some embodiments, the one or more color properties are a hue HSL property and the color property threshold is a hue threshold $h_{th}$. In various embodiments, the one or more color properties are a lightness HSL property and the color property threshold is a lightness threshold lth. In some embodiments, the one or more color properties are a saturation HSL property and the color property threshold is a saturation threshold lth. In various embodiments, saturation is identical among the colors in the target color set 120 and, therefore, saturation is not used as a color property. In some embodiments, the one or more color properties are hue and lightness.

In some embodiments, the color thresholds are based on percentage differences. For example, the hue threshold $h_{th}$ is a 10% difference between the hue value of $A_i$ and the hue value of $B_j$. In various embodiments, the color thresholds are based on a numerical difference. For example, the lightness threshold $l_{th}$ is a difference of 20 between the lightness value of $A_i$ and the lightness value of $B_j$.

In various embodiments, $h_{th}$ is a numerical difference of about 2, about 5, about 10, about 20, about 30, about 40, about 50, about 100, abut 200, about 300, and any value or range between any two of these values (including endpoints). In some embodiments, lth is a numerical difference of about 2, about 5, about 10, about 20, about 30, about 40, abut 50, and any value or range between any two of these values (including endpoints). In various embodiments, $s_{th}$ is a numerical difference of about 0 (identical), about 1, about 2, about 3, about 4, abut 5, about 10, about 15, about, about 20, about 30, about 40, about 50, and any value or range between any two of these values (including endpoints). In various embodiments, one or more of thresholds $h_{th}$, lth, and/or $s_{th}$ are a percentage difference of about 1%, about 2%, about 3%, about 4%, about 5%, about 6%, about 7%, about 8%, about 9%, about 10%, about 20%, about 25%, about 30%, about 40%, about 50%, about 60%, about 78%, about 80%, about 90%, and any value or range between any two of these values (including endpoints). In some embodiments, a lightness threshold is about 0.2 (or 20%). In various embodiments, a hue threshold is 1/30 (or 3.33%).

In some embodiments, thresholds $h_{th}$, lth, and/or $s_{th}$ are an upper limit threshold (e.g., color $A_i$ is added to the cluster if the color property is less than the corresponding color property of $B_j$ by the threshold). In some embodiments, thresholds $h_{th}$, lth, and/or $s_{th}$ are a lower limit threshold (e.g., color $A_i$ is added to the cluster if the color property is greater than the corresponding color property of $B_j$ by the threshold). In various embodiments, thresholds $h_{th}$, lth, and/or $s_{th}$ are an upper/lower limit or band threshold (e.g., color $A_i$ is added to the cluster if the color property is within the range of the corresponding color property of $B_j$ defined by the threshold).

In some embodiments, the color clustering engine 114 analyzes the colors in a target color set 120 all at the same time (i.e., simultaneously). In various embodiments, the color clustering engine 114 analyzes the colors in a target color set 120 in a specific order, such as $A_1$-$A_n$. In some embodiments, the order is the sequence of the colors in the target color set 120, for instance, as added to the target color set 120 during the extraction process. In some embodiments, the order is a random order. In various embodiments, the order is based on the weights of the colors in the color set, for example, with the highest weight as $A_1$ (or vice versa, with the highest weight as $A_n$). In some embodiments, color $A_{i+1}$ is selected based on a color property, for example, being within a threshold of the corresponding color property of $A_i$. For example, color $A_{i+1}$ is selected if the color has a hue that is within 20 of the hue of $A_i$.

Once all of the colors of the target color set 120 have been processed into clusters, the color clustering engine 114 reduces the colors in each cluster to a single cluster color by setting the color for each cluster to the average color within the cluster to generate a clustered target color palette 122. In some embodiments, the average color is determined by averaging each of the color properties associated with each color. For instance, in the HSL color space, the average color is determined by averaging the hue, saturation, and lightness HSL components to determine the new color with the average HSL values. For example, if a cluster has two colors including a first color with the HSL values of (200, 40, 40) and a second color with the HSL values of (100, 20, 20), the average color is ((200+100)/2, (20+40)/2, (20+40)/2)=(150, 30, 30). In various embodiments, a predetermined subset of the color properties are used. For example, in one embodiment, the average color is determined by averaging the lightness and hue HSL values. In other embodiments, the average color is determined by averaging a subset of the color properties, such as only the hue and lightness values, and assigning the remaining color properties not used in the averaging calculation (e.g., saturation).

The color clustering engine 114 generates a clustered target color palette 122 that includes a set of clusters each with one color (i.e., the average color after all of the colors of the target color set 120 have been assigned to the clusters). Accordingly, the clustered target color palette 122 includes fewer colors than the originating target color set 120. In some embodiments, the clustered target color palette 122 includes about 10 to about 100 colors. In various embodiments, the number of clusters is based on a threshold parameter setting a cluster limit (e.g., a maximum of between 10 and 1000 clusters).

In some embodiments, a source color palette 116 is provided to the color clustering engine 114 to generate a clustered source color palette using the color clustering process. A clustered source color palette is provided to the destination color palette engine 140 as the source color palette for the stochastic color mapping process according to various embodiments.

The clustered target color palette 122 is provided to the destination color palette engine 140 to generate destination color palettes 124 according to various embodiments, for instance, using the stochastic color mapping process (e.g., pEMD or ε-pEMD). The destination color palettes 124 include a clustered number of colors, for example, corresponding or substantially corresponding to the number of colors in the clustered target color palette 122. For example, if the clustered target color palette 122 included 10 colors, the corresponding clustered destination color palettes 124 would include 10 colors.

The destination color palettes 124 are provided to a color de-clustering engine 118. The color de-clustering engine 118 performs a color de-clustering process to restore the original number of colors and color relationships after the clustered target color palette 122 has been mapped using the stochastic color mapping process (e.g., pEMD or ϵ-pEMD). The color de-clustering process operates to maintain the same or similar color relationships between certain color properties, such as hue, lightness, saturation, contrast, etc. relationships.

For example, a first color and a second color in a target graphic have a lightness difference of 20%. The colors mapped to replace the first color and the second color in the recolored graphic are different colors, but share the same (or similar) lightness difference of 20%. In some embodiments, the lightness relationship is multiplicative (e.g., if color $A_1$ becomes (lightness*2), lightness for the other cluster colors also becomes (lightness*2)). In various embodiments, the hue relationship is additive (e.g., if color $B_1$ becomes (hue—20), hue for the other cluster colors also becomes (hue—20)). By maintaining the color property relationships, the recolored target graphics more closely resemble the palette relationships of the original image, facilitating generation of recolored graphics with harmonious, pleasing color schemes and reducing or even eliminating unwanted jarring or clashing results.

For the color de-clustering process, the color de-clustering engine 118, letting the average color of cluster $C_j$ be $\hat{c}_j$, where $\hat{c}_j = \hat{h}_j, \hat{s}_j, \hat{l}_j$, for each color c:=(h, s, l)∈Cj, the color de-clustering engine 118 stores the hue $\Delta h_c$ and lightness $\Delta l_c$ difference values computed using the following Equations (14) and (15):

$$\Delta h_c = h - \hat{h}_j,$$

$$\Delta l_c = \begin{cases} \dfrac{l}{\hat{l}_j}, & \text{if } l \geq \hat{l}_j, \\ \dfrac{l - \hat{l}_j}{1 - \hat{l}_j}, & \text{otherwise.} \end{cases}$$

The hue $\Delta h_c$ and lightness $\Delta l_c$ differences store the color property difference values between the average color of a cluster (determined during the color clustering process) and the original target colors that were segmented into the cluster. For example, during the color clustering process, colors $A_1$ and $A_2$ are assigned to cluster Cl$_1$, and were averaged to color $B_1$. During the stochastic color mapping process, color $B_1$ was replaced with color $C_1$. Prior to mapping, the hue difference $\Delta h_c$ and lightness difference $\Delta l_c$ between $A_1$ and $B_1$ are computed and stored, and the hue difference $\Delta h_c$ and lightness difference $\Delta l_c$, between $A_2$ and $B_1$ are computed and stored. The hue $\Delta h_c$ and lightness $\Delta l_c$, differences are computed and stored for each of the original target colors and the respective average color of their assigned cluster. For Equation (15), the $\hat{l}_j$ value is expressed as a decimal value (e.g., 1-$\hat{l}_j$ for an $\hat{l}_j$ of 10% is (1-0.1).

In various embodiments, saturation is not included in the de-clustering process. For example, saturation is not included in the stored data because saturation within each cluster is identical (or substantially identical). In some embodiments, a saturation value $\Delta s_c$ is stored by the color de-clustering engine 118, for example, $\Delta s_c = s - \hat{s}_j$ or $\Delta s_c = \hat{s}_j$.

In one example, in the color clustering process, cluster $C_1$ was formed as the average of a first color (e.g., $A_1$) with h, s, l HSL values of (100, 20, 20) and a second color (e.g., $A_2$) with HSL values of (200, 40, 40) for an average color $\hat{c}_1$ of cluster $C_1$ with a $\hat{h}_j, \hat{s}_j, \hat{l}_j$ of (150, 30, 30). In this example, $\Delta h_c$ values of −50 (for the first color) and 50 (for the second color) are computed and stored. In this example, $\Delta l_c$ values of −0.14 (for the first color) and 1.33 (for the second color) are computed and stored.

Let $\hat{c}^*_j = \hat{h}^*_j, \hat{s}^*_j, \hat{l}^*_j$ be mapped to $\hat{c}_j$ by stochastic color mapping (e.g., pEMD or ϵ-pEMD) according to various embodiments. Each color c∈$C_j$ is transformed to c*=h*, s*, l* according to the following Equations (16)-(18):

$$h* = \hat{h}^*_j + \Delta h_c,$$

$$s* = \hat{s}^*_j,$$

$$l* = \begin{cases} \hat{l}^*_j \Delta l_c, & \text{if } l_c \geq \hat{l}_j, \\ \hat{l}^*_j + \dfrac{\Delta l_c}{1 - \hat{l}_j}, & \text{otherwise.} \end{cases}$$

Accordingly, a new or modified color (c*) $D_1$ is computed based on the $\Delta h_c$ and $\Delta l_c$ values determined for color $A_1$ and the color property values of mapped $C_1$ (e.g., $\hat{c}^*_j = \hat{h}^*_j, \hat{s}^*_j, \hat{l}^*_j$ mapped to $\hat{c}_j$ by stochastic color mapping (e.g., pEMD or ϵ-pEMD) using Equations (16)-(18)). Modified colors (c*) $D_2$-$D_n$ are determined for the remainder of original target colors $A_2$-$A_n$ in the target color set 120 that were used to generate the clustered color palette. Each color c* is computed by the color de-clustering engine and assigned to populate the de-clustered destination color palette 126.

The color de-clustering engine 118 generates one de-clustered destination color palette 126 for each of the clustered color palettes 124 generated by the destination color palette engine 140. The destination color palettes 126 are provided to the image recoloring engine 132 to generate the recolored images 128.

Figure 3:
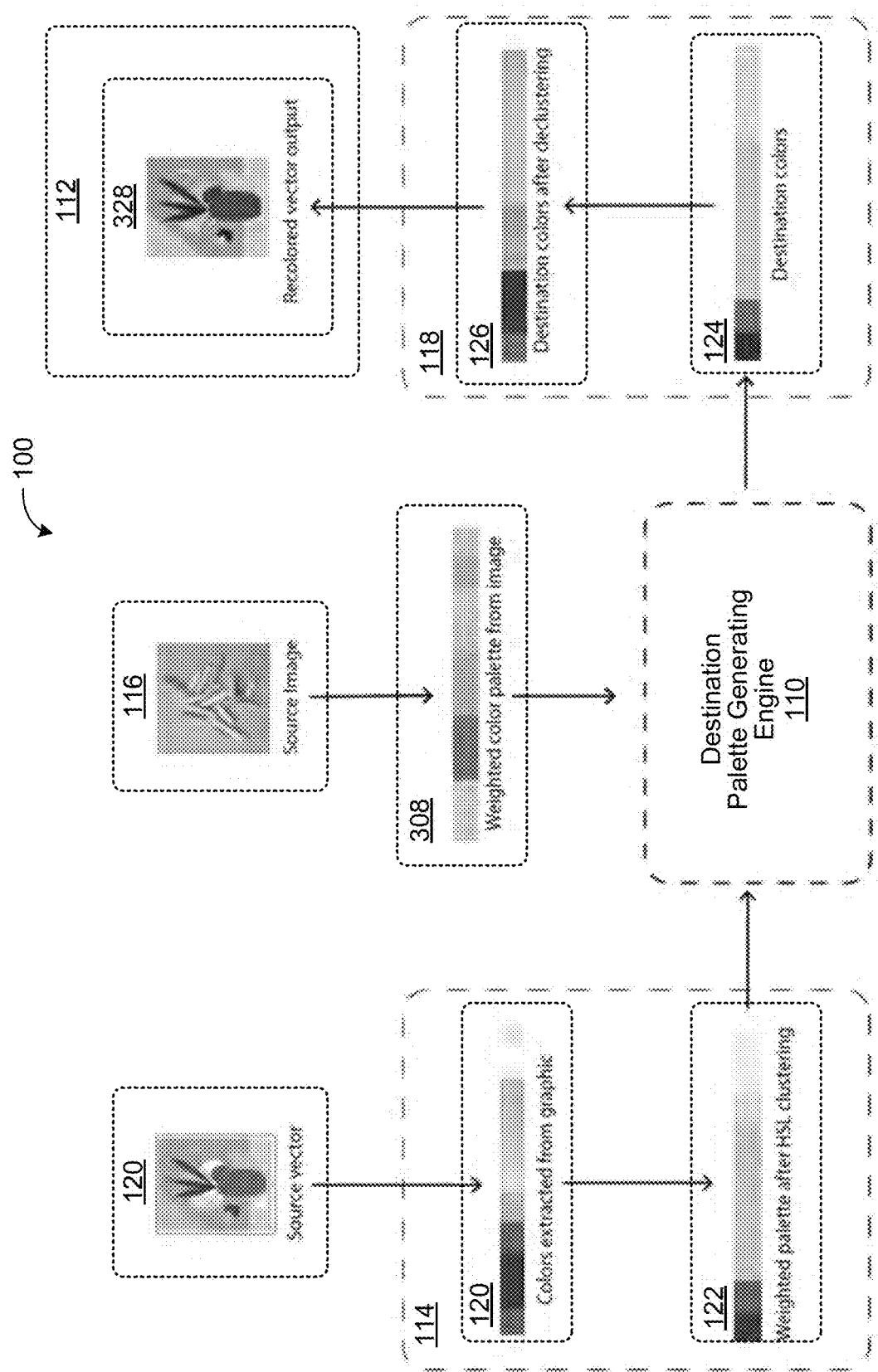
FIG. 3 illustrates a recoloring system according to one embodiment.

FIG. 3 illustrates a recoloring system 100 according to one embodiment. In some embodiments, a target vector image 120, specified by a user for recoloring (such as through a text-to-image prompt), is accessed by the color clustering engine 114. The color clustering engine 114 (or, in some embodiments, the palette processing engine 108 if color clustering is not performed) extracts the colors from the target vector image 120 to generate a target color set 120. The color clustering engine 114 generates a clustered target color palette 122 using a color clustering process according to various embodiments. The clustered target color palette 122 is accessed by the destination color palette engine 140.

A user specifies a source graphic 116 via the recoloring system 100 to be used to recolor the target vector image 120, including through a text-to-image prompt or other user prompt selection (see, for example, FIGS. 10A-10F). In some embodiments, a source color palette 308 is generated from the source graphic 116. In various embodiments, the clustered target color palette 122 and the source color palette 308 include the same number of colors (e.g., a one-to-one correspondence). In some embodiments, the clustered target color palette 122 and the source color palette 308 do not include the same number of colors. The source color palette 308 is accessed by the destination color palette engine 140.

The destination color palette engine 140 performs the stochastic color mapping process to generate a clustered destination color palette 124. The color de-clustering engine 118 accesses the clustered destination color palette 124 and performs a color de-clustering process to generate the de-clustered destination color palettes 126. The image recoloring engine 132 recolors the target vector image 120 to generate multiple recolored images 128 based on the de-clustered destination color palettes 126.

Operations for the disclosed embodiments are further described with reference to the following figures. Some of the figures include a logic flow. Although such figures presented herein include a particular logic flow, the logic flow merely provides an example of how the general functionality as described herein is implemented. Further, a given logic flow does not necessarily have to be executed in the order presented unless otherwise indicated. Moreover, not all acts illustrated in a logic flow are required in some embodiments. In addition, the given logic flow is implemented by a hardware element, a software element executed by one or more processing devices, or any combination thereof. The embodiments are not limited in this context.

Figure 4:
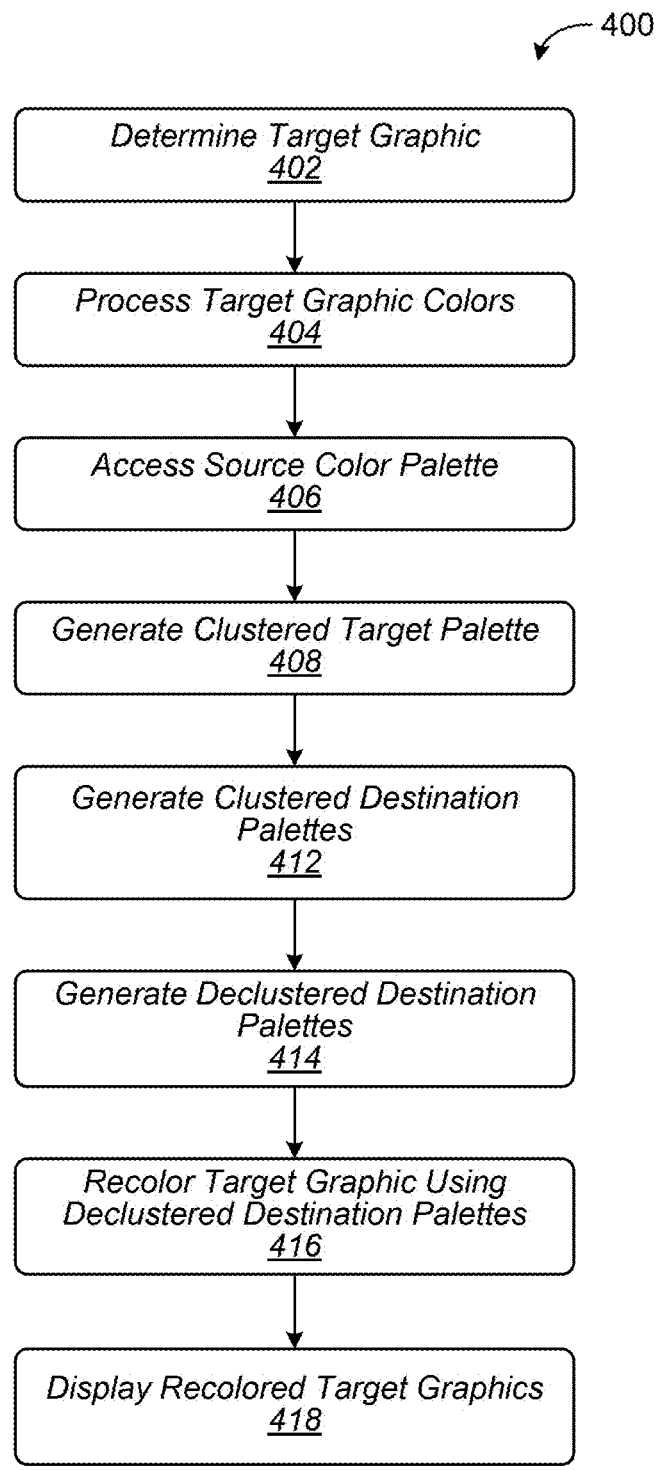
FIG. 4 illustrates a first logic flow in accordance with one embodiment.

FIG. 4 illustrates an embodiment of a logic flow 400. The logic flow 400 is representative of some or all of the operations executed by one or more embodiments described herein. For example, the logic flow 400 includes some or all of the operations performed by devices or entities within the recoloring system 100. In one embodiment, the logic flow 400 is implemented as instructions stored on a non-transitory computer-readable storage medium, such as the storage medium 1302, that when executed by the processing circuitry, for instance, of computing architecture 1400, causes the processing circuitry to perform the described operations. The storage medium 1302 and processing circuitry may be co-located, or the instructions may be stored remotely from the processing circuitry. Collectively, the storage medium 1302 and the processing circuitry may form a system.

In block 402, the logic flow 400 includes determining a target graphic. The target graphic is an image or other graphical element that a user wants to be recolored. For example, a user uploads an image file (e.g., a vector image file) to the recoloring system 100 via a user interface engine 102. In another example, a user enters a text prompt (e.g., "desert landscape") and one or more target graphics are generated based on the natural language of the text prompt, for instance, via a text-to-image diffusion model process of a input information processing engine 106.

At block 404, the target graphic colors of the target graphic are processed by the logic flow 400, for instance, to generate a target color set of all of the colors present in the target graphic. The logic flow 400 includes accessing a source color palette at block 406. For example, a user selects from a library of source color palettes presented on a user interface generated by the user interface engine 102. In another example, a source color palette is generated based on a prompt input (see, for example, FIGS. 9A-9C) by the user.

Figure 5:
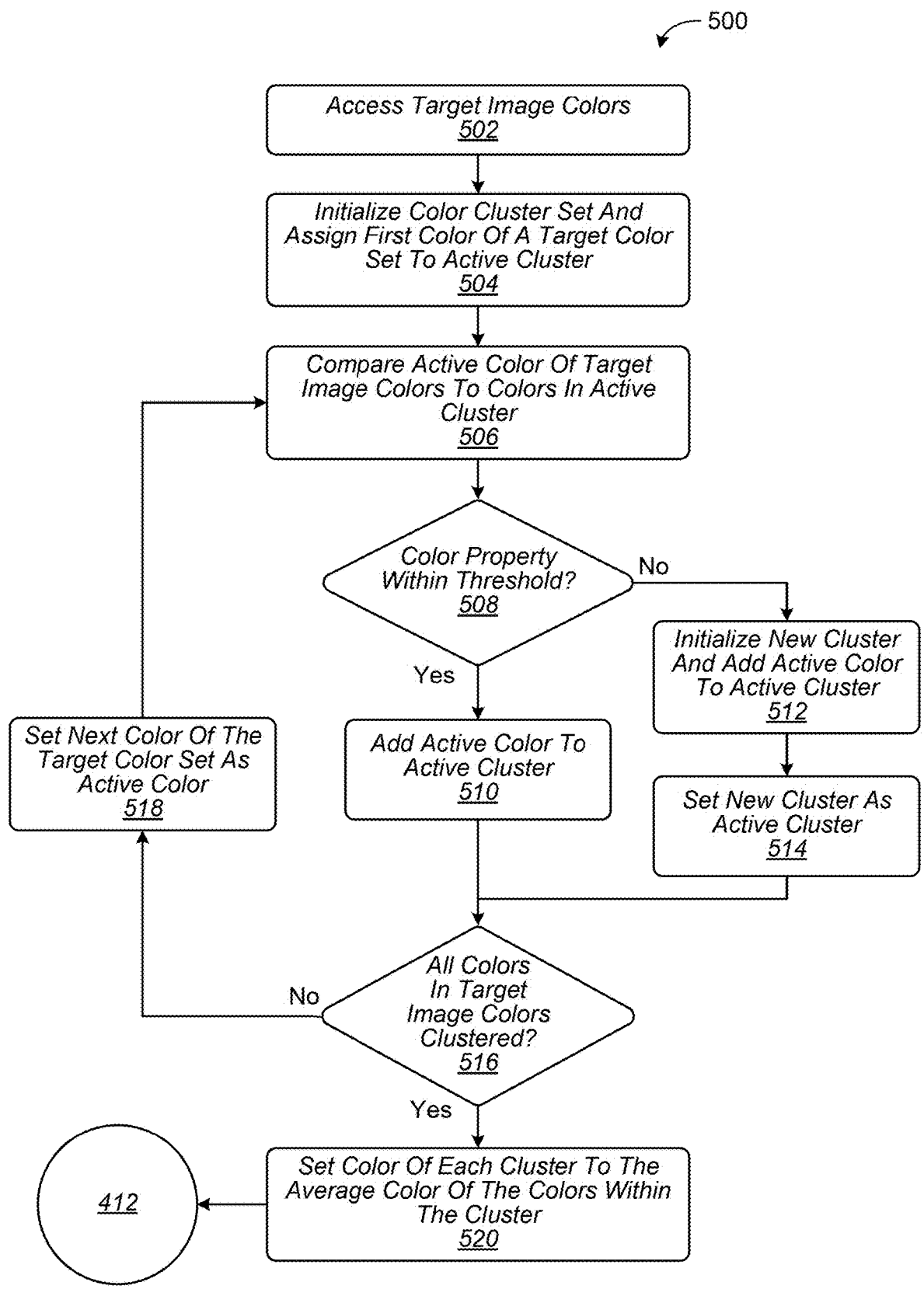
FIG. 5 illustrates a second logic flow in accordance with one embodiment.

At block 408, the logic flow 400 includes generating a clustered target palette. FIG. 5 illustrates an embodiment of a logic flow 500 representative of some or all of the operations executed by one or more embodiments of a color clustering engine 114 described herein for a color clustering process. In some embodiments, block 408 performs the process depicted in FIG. 5.

At block 502, the logic flow 500 includes accessing target graphic colors. For example, the color clustering engine 114 receives a target color set 120 extracted from a target image. The logic flow 500 includes initialing a color cluster set and assigning a first color of a target color set to the active cluster at block 504. For example, the target color set 120 includes colors $A_1$-$A_n$, the color clustering engine creates cluster $C_1$, and assigns color $A_1$ to $C_1$. At block 506, the logic flow 500 includes comparing the active color to the colors in the active cluster. For example, for each color $A_i$ in the target color set 120 of colors $A_1$-$A_n$, the color clustering engine 114 compares the color $A_i$ to all colors $B_j$ in the active or present cluster. For instance, one or more color properties including, for example, one or more HSL components, are compared between the active color and the other colors in the active cluster. In some embodiments, the one or more color properties are hue and lightness. The logic flow 500 determines whether the one or more color properties are within a color property threshold at block 508.

If the active color is not within the color property threshold, the logic flow 500 includes initializing a new cluster and adding the active color to the new active cluster at block 512. At block 514, the new cluster is set as the active cluster by the logic flow 500. For example, if color $A_2$ is not within a hue threshold (and/or lightness threshold) of color $A_1$ of cluster $C_1$, new cluster $C_2$ is created and set as the active cluster, then color $A_2$ is added to cluster $C_2$. If the active color is within the color property threshold, the logic flow 500 includes adding the active color to the active cluster at block 510. For example, if color $A_2$ is within a hue threshold (and/or lightness threshold) of color $A_1$ of cluster $C_1$, color $A_2$ is added to cluster $C_1$.

After block 510 or 514 have been completed by the logic flow 500, the logic flow 500 includes determining whether all of the colors have been clustered at block 516. If all of the colors have not been clustered, the logic flow 500 sets the next color of the target color set as the active color at block 518, and the logic flow 500 returns to block 506. If all of the colors have been clustered, the logic flow 500 finalizes the clustered target color palette by setting the color of each color to the average color of the colors within the cluster. For example, in some embodiments, the average color is determined by averaging each of the color properties associated with each color (e.g., averaging the hue, saturation, and lightness HSL components to determine the new color with the average HSL values). After completion of block 520, the logic flow 500 returns to block 412 of the logic flow 400.

Figure 6:
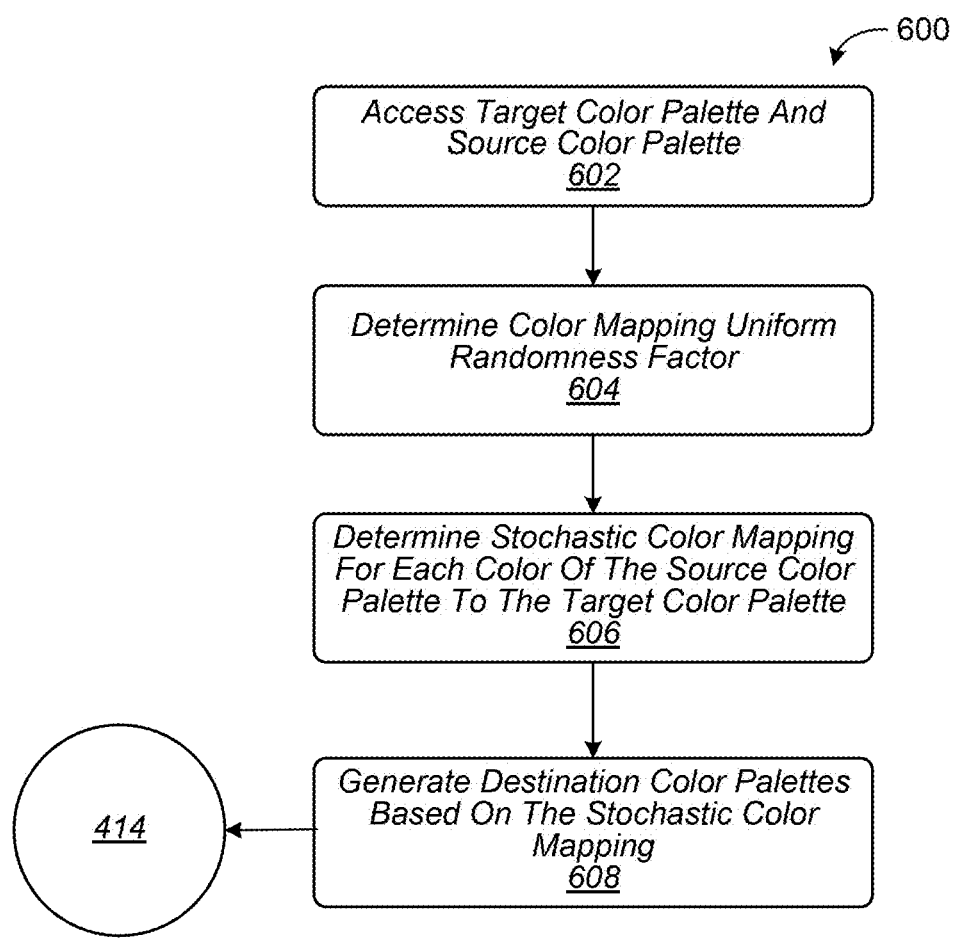
FIG. 6 illustrates a third logic flow in accordance with one embodiment.

At block 412, the logic flow 400 generates destination color palettes. FIG. 6 illustrates an embodiment of a logic flow 600 representative of some or all of the operations executed by one or more embodiments of a destination color palette engine 140 to perform a stochastic color mapping process (e.g., pEMD or $\epsilon$-pEMD) to generate destination color palettes. In some embodiments, block 412 performs the process depicted in FIG. 6.

At block 602, the logic flow 600 includes accessing a target color palette (including, for example a clustered target color palette) and a source color palette. For example, destination color palette engine 140 receives a clustered color palette 122 from the color clustering engine 114 and a source color palette 116. The logic flow 600 includes determining a randomness factor at block 604, for example, to facilitate further randomization by giving a minimum nonezero probability to all target states. In some embodiments, the randomness factor is a tuning parameter, for instance, for the destination color palette engine 140. In various embodiments, the randomness factor is a condition of the starting state of a color in the target color set 120, for instance, as described in Equation (13).

At block 606, the logic flow 600 includes determining a stochastic color mapping for replacing colors of the clustered target color palette with colors of the source color palette, for instance via a pEMD or $\epsilon$-pEMD process, such as according to Equations (11) and/or (12). For example, the destination color palette engine 140 generates a set of flows or mappings that map the color distribution of the source color palette to the colors of the clustered target color palette. A transition probability Pr is determined based on the EMD color distribution (e.g., the minimum cost $\omega^*$ determined in Equation (9)). The transition probability Pr (e.g., of Equations (10) or (11)) is used to determine source colors to use to replace target colors. For example, for each color t in the target color set 120, a source color s is determined based on the transition probability Pr and used to replace t.

Through the use of the transition probability Pr, the determination of source colors is not based on a deterministic optimization problem (i.e., EMD), in which each time a mapping is computed, each target color t would be replaced by the same source color s (if the same target color palette and source color palette were used for each iteration). Instead, the determination of source colors is based on a stochastic-based process that introduces probability and randomness, such that multiple mappings for the same target color palette and source color palette will generate new mappings for each iteration.

The logic flow 600 generates a plurality of destination color palettes based on the stochastic color mapping at block 608. For example, each color of the clustered target color palette is replaced by a color of the source color palette based on the probabilistic EMD distribution. Once block 608 has completed, the logic flow 600 returns to block 414 of the logic flow 400.

Figure 7:
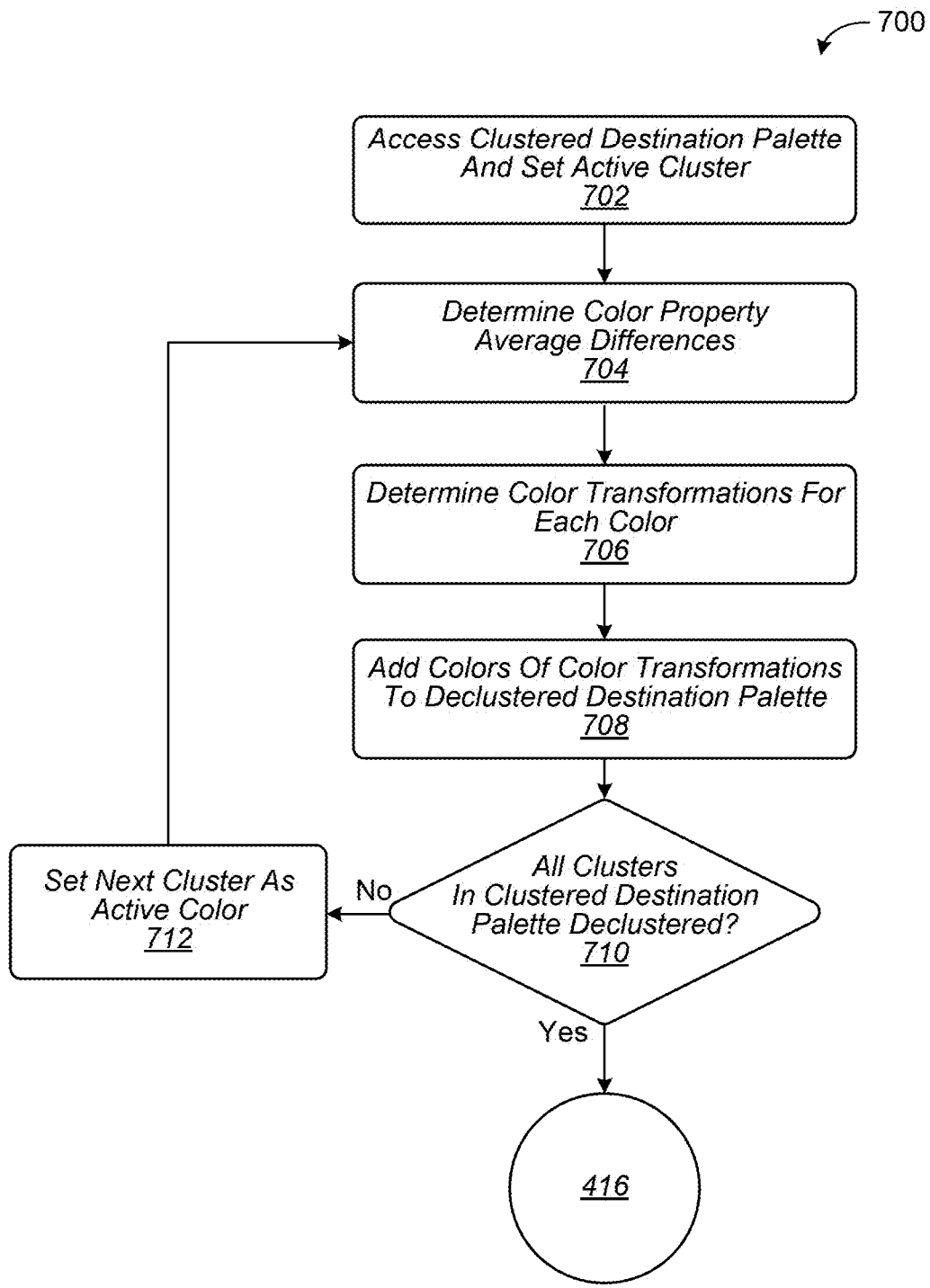
FIG. 7 illustrates a fourth logic flow in accordance with one embodiment

At block 414, the logic flow 400 includes generating de-clustered destination color palettes. FIG. 7 illustrates an embodiment of a logic flow 700 representative of some or all of the operations executed by one or more embodiments of a color de-clustering engine 118 described herein for a color de-clustering process. In some embodiments, block 414 performs the process depicted in FIG. 7.

At block 702, the logic flow 700 includes accessing a clustered destination palette and setting an active cluster (or active color). For example, the color de-clustering engine 118 accesses the clustered destination palettes 124 computed by the destination palette generating engine 140. Each clustered destination palette 124 includes a set of clusters that include a single color. The single color for each cluster is the color assigned via the stochastic color mapping process performed by the destination color palette engine 140.

The logic flow 700 includes determining color property average differences at block 704. Illustrative color property average differences include hue and lightness average differences. For example, for each original target color of the target color set 120 assigned to a cluster of a clustered color palette during the color clustering process, the color de-clustering engine 118 stores a hue difference $\Delta h_c$ based on a hue of the original color in the target color set and the hue of the average color determined for the cluster during the color clustering process (for instance, according to Equation (14)). In another example, for each original target color of the target color set 120 assigned to a cluster of a clustered color palette during the color clustering process, the color de-clustering engine 118 stores a lightness difference $\Delta l_c$ based on a lightness of the original color in the target color set and the lightness of the average color determined for the cluster during the color clustering process (for instance, according to Equation (15)).

The logic flow 700 includes determining color transformations for each color at block 710. For example, for each original target color of the target color set 120 associated with the active cluster, each original target color is transformed to a modified color based on the color property difference (e.g., $\Delta h_c$ or $\Delta l_c$) and the color properties of the color assigned to the cluster during the stochastic color mapping process. For example, hue, saturation, and lightness values are determined via the color transformation processes of Equations (16)-(18). At block 708, the logic flow includes adding the colors of the color transformations to the de-clustered destination color palette. For example, the color de-clustering engine 118 generates a de-clustered color palette 126 using the colors generated at block 706.

The logic flow 700 includes determining whether all clusters in the clustered destination palette have been de-clustered at block 710. If all clusters in the clustered destination palette have not been de-clustered, the logic flow 700 includes setting the next cluster as the active cluster at block 712 and proceeding back to block 704. If all clusters in the clustered destination palette have been de-clustered, the logic flow 700 proceeds to block 416 of the logic flow 400.

At block 416, the logic flow 400 includes recoloring the target graphic using the de-clustered destination palettes at block 416. The recolored target graphics are displayed by the logic flow 400 at block 418 (see, for example, FIGS. 9A-9C or FIG. 10B).

FIG. 8 illustrates a block diagram of a process for generating a destination color palette according to one embodiment. The steps 851-866 of FIG. 8 graphically depict the blocks of logic flows 500, 600, and 700. For example, steps 851-861 depict a color clustering process according to the logic flow 500; step 862 depict the generation of a destination color palette according to the logic flow 600; and steps 863-866 depict the de-clustering of the destination color palette according to the logic flow 700.

In step 851, a target color set 802 containing colors $A_1$-$A_{10}$ is accessed, for instance, by color clustering engine 114. The ten colors of target color set are an exemplary number of colors and a target color set can include more or fewer colors.

In step 852, first color $A_1$ is the active color of the color clustering process and, since there are no active clusters, $A_1$ is assigned to a first cluster 806 of cluster set 804. At step 853, color $A_2$ is set as the active color and is compared with all of the colors (e.g., $A_1$) of the active cluster 806. $A_2$ is within the color property thresholds (e.g., hue and lightness HSL values) of $A_1$ and, as such, is added to cluster 806. At step 854, $A_3$ is set as the active color and is compared with the color properties of $A_1$ and $A_2$ of the active cluster 806. $A_3$ is outside of the color property threshold of color $A_2$ and, as a result, new cluster 808 is initialized and $A_3$ is added to the new cluster 808. The comparison steps are continued for $A_4$-$A_{10}$ (not shown to simplify the figure) to generate the final cluster set 804 of step 860, with clusters 806, 808, 810, and 812. In step 861, the colors in the clusters 806, 808, 810, and 812 are averaged to generate finalized clustered destination palette 804 with a single color for each cluster, for example, color $B_1$ for cluster 806, color $B_2$ for cluster 808, color $B_3$ for cluster 810, and color $B_4$ for cluster 812. In some embodiments, the average colors $B_1$-$B_4$ are computed by averaging the color properties for the colors assigned to the respective cluster. For instance, $B_1$ is computed by averaging the hue, saturation, and lightness values of $A_1$ and $A_2$.

In step 862, the destination color palette engine 140 receives the clustered destination color palette 804 and determines colors $C_1$-$C_4$ for clusters 806, 808, 810, and 812 using a stochastic color mapping process according to some embodiments, for example, a pEMD or ϵ-pEMD process according to the Equations (10) or (12). For example, colors $C_1$-$C_4$ are colors from the source color palette that are mapped to clusters 806, 808, 810, and 812 to replace colors $B_1$-$B_4$.

Although only one clustered destination palette 804 is depicted in step 862 to reduce the complexity of FIG. 8, the destination color palette engine 140 generates a plurality of clustered destination palettes 804 based on the same clustered color palette 804 and a source color palette (not shown). For example, due to the stochastic nature of the stochastic color mapping process, including as modified by the randomization factor, different outputs (destination color palettes) are generated based on the same input (clustered target color palette and source color palette).

In step 863, the color de-clustering engine 118 accesses the clustered destination color palette 804 and initiates a color de-clustering process. The clustered destination color palette 804 is formed of a set of colors, with each color associated with a cluster (e.g., clusters 806, 808, 810, and 812) that was used during the recoloring process for clustering and mapping colors according to various embodiments.

Each color (or cluster) of the clustered destination color palette 804 is associated with original target colors of the target color set that was used to generate the associated clusters. For example, color $C_1$ is associated with original target colors $A_1$ and $A_2$ (cluster 806), color $C_2$ is associated with original target color $A_3$ (cluster 808), $C_3$ is associated with original target colors $A_4$-$A_6$ (cluster 810), and $C_4$ is associated with original target colors $A_4$-$A_6$ (cluster 812). Color $C_1$ is de-clustered based on hue and lightness values of $C_1$ and $\Delta h_c$ and $\Delta l_c$, values associated with the original target colors $A_1$ and $A_2$. For example, hue $\Delta h_c$ and lightness $\Delta l_c$ values are determined for colors $A_1$ and $A_2$ based on color property values of $B_1$ and original target colors $A_1$ and $A_2$ using Equations (14) and (15). New or modified color $D_1$ is computed based on the $\Delta h_c$ and $\Delta l_c$ values determined for color $A_1$ and the color property values of $C_1$ (e.g., $\hat{c}^*_j = \hat{h}^*_j$, $\hat{s}^*_j$, $\hat{l}^*_j$ mapped to $\hat{c}_j$ by stochastic color mapping (e.g., pEMD or $\epsilon$-pEMD)) using Equations (16)-(18). Similarly, modified colors $D_2$-$D_{10}$ are computed based on the $\Delta h_c$ and $\Delta l_c$ values of the associated original target colors (e.g., $A_2$-$A_{10}$) and the corresponding values of the colors mapped to the cluster (e.g., $C_1$-$C_4$).

At block 866, color de-clustering engine 118 has processed all of colors $C_1$-$C_4$ (or clusters 806, 808, 810, and 812) to generate the destination color palette 822 containing colors $D_1$-$D_{10}$. The colors of the destination color palette 822 are used to recolor a target graphic.

Figure 9C:
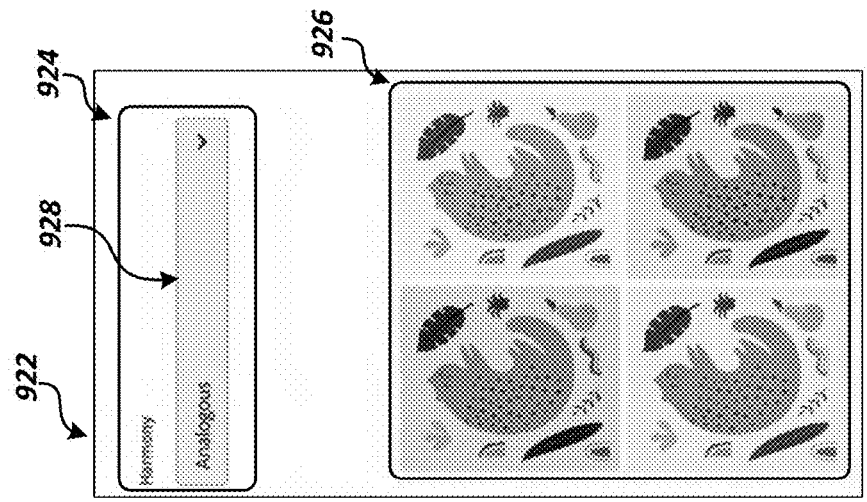
FIGS. 9A-9C depicts illustrative image recoloring user interfaces according to some embodiments.
Figure 9B:
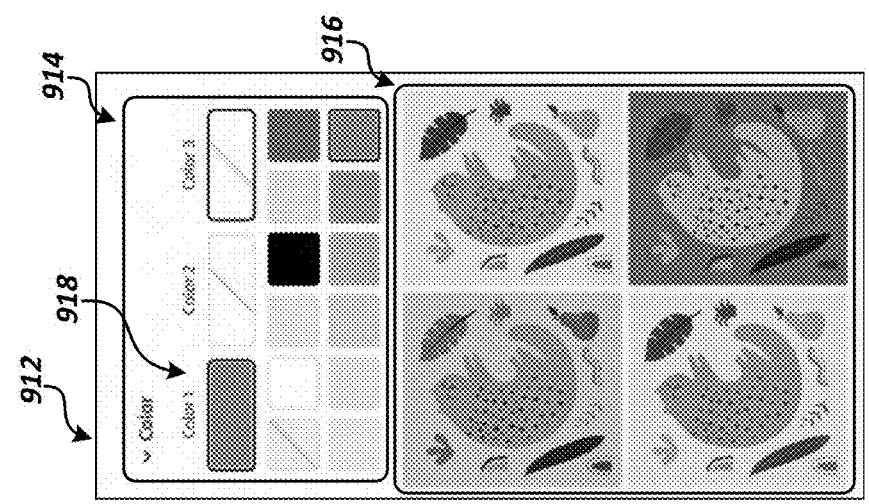
Figure 9A:
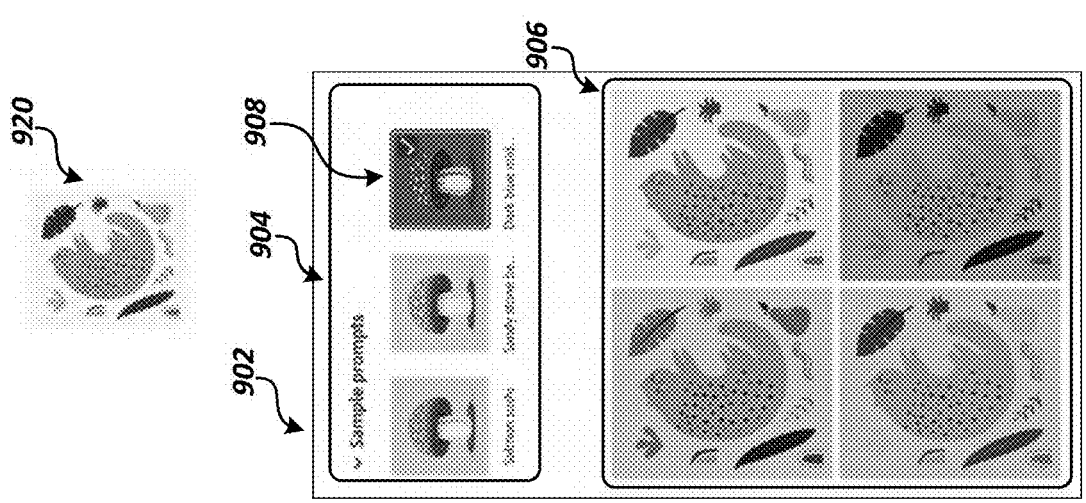

FIGS. 9A-9C depicts illustrative image recoloring user interfaces according to some embodiments. Theme input, for instance, input 112 of FIG. 1, is capable of being provided by a user in various ways. As shown in FIG. 9A, user interface 902 is configured to allow for theme input via various prompts, such as a graphic selection object 904. In some embodiments, images displayed via graphic selection object 904 may be based on a text prompt. Selection of an image 908 of graphic selection object 904 leads to recoloring of original target graphic 920 to generate recolored images 906 recolored according to a stochastic recoloring process of various embodiments. For instance, responsive to selection of the image 908, the set of recolored images 906 are displayed. Due to the randomized, probabilistic nature of the stochastic recoloring process, the recolored images 906 are recolored based on randomized, probabilistic palettes, leading to a vast array of possible recolored images 906 with different color palettes. A user can refresh the recolored images 906 to obtain a new set of recolored images 906 recolored with different color palettes, either with the same theme (e.g., the color palette of image 908) or a new theme. In this manner, a user can efficiently and easily cycle through a large number of recolored images until they locate one that is recolored to meets their needs, style, design goals, etc. In addition, a user is able to easily and effectively review a recolored image with a color palette that the user may have never derived on their own due to the simplicity and speed of generating new recolored images via user interface 902, 912, and 922.

As shown in FIG. 9B, a user can select a color 918 (e.g., "red") of a color selector 914 to include this color in the color palette of images 916 recolored based on stochastic recoloring processes according to some embodiments. As shown in FIG. 9C, a color theory selector 924 can be used to select a particular color theory setting 928, such as harmonious, monochromatic, complementary, analogous, etc., to use as or as part of the theme input, to generate recolored images 926.

In various embodiments, the selection of theme input objects can be successive or can start a new set of recolored images. For example, a user can select image 908 to recolor the target graphic 920 based on the theme of prompt 908 to generate recolored images 906, and then select the color selector 914 to add one or more colors 908 to recolored images 906 to generate recolored images 916. In this manner, a user can generate a wide array of recolored images, and then make minor, fine-tuning changes once the user arrives at a general theme of interest (e.g., the user is interested in a "tropical" theme of one of the recolored images, but requires more "blue" color).

FIGS. 10A-10F depict examples of a recoloring interface 1000 that is used for executing recoloring workflows. In some embodiments, the recoloring interface 1000 is implemented via user interface engine 102.

Figure 10A:
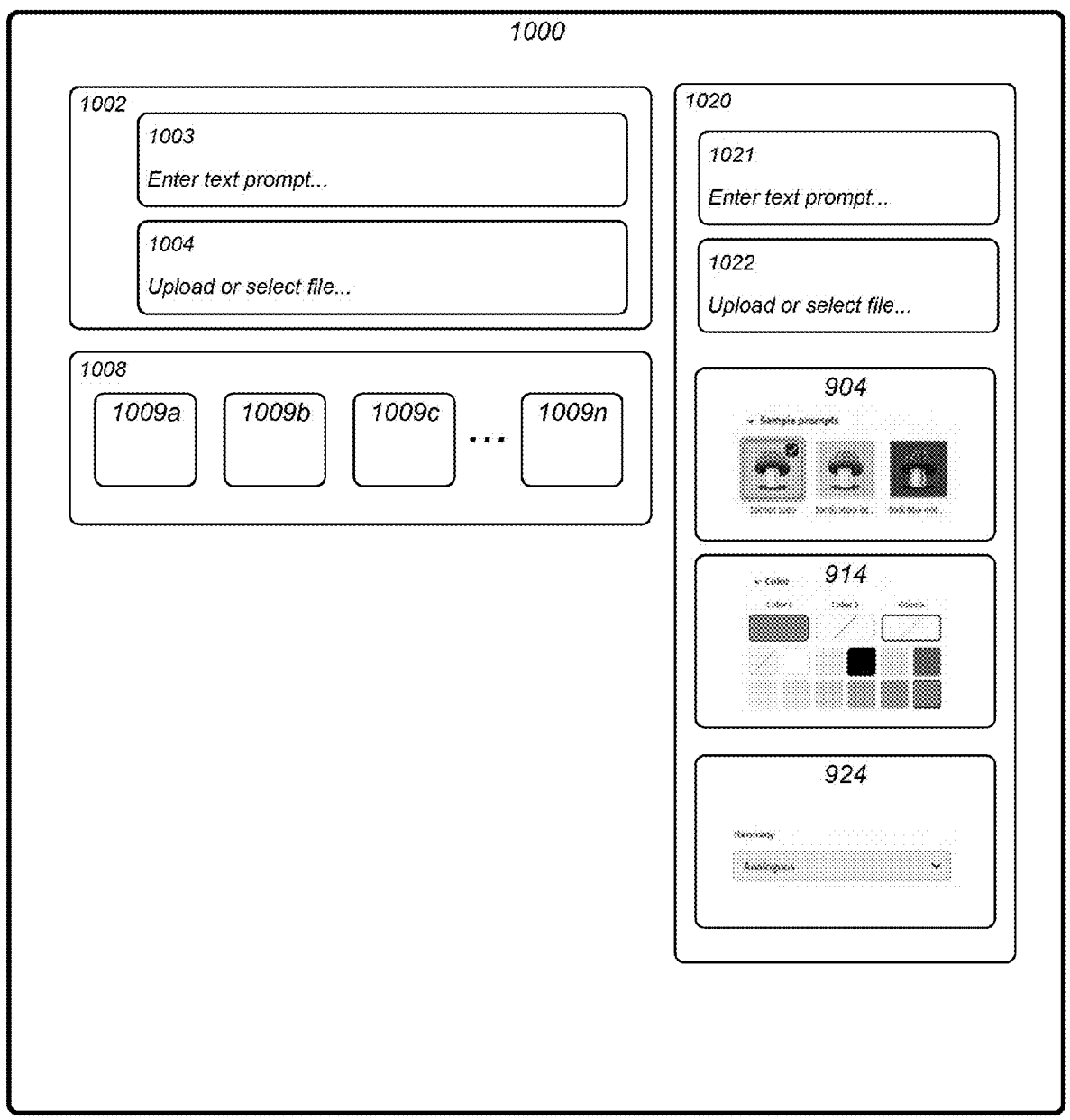
FIGS. 10A-10F depicts illustrative recoloring interfaces according to some embodiments.

As shown in FIG. 10A, the recoloring interface 1000 includes target graphic input 1002 for a user to specify a target graphic for recoloring. In some embodiments, the target graphic input 1002 includes text input 1003 or file input 1004. The text input 1003 is used for text-to-image input to generate a graphic based on a text prompt. The file input 1004 allows a user to upload or drag-and-drop a graphic file. In various embodiments, the user selects a target graphic from an asset selector 1008 displaying a set of predefined graphic assets 1009a, 1009b, 1009c . . . 1009n for use within the recoloring system.

Recoloring interface 1000 includes source color palette tools 1020 for specifying a source color palette. In some embodiments, the source color palette tools 1020 include a text input 1021 or file input 1022. The text input 1003 is used for text-to-image input to generate a source graphic or source color palette based on a text prompt. The file input 1004 allows a user to upload or drag-and-drop a graphic file to operate as the source of the source color palette. In various embodiments, the source color palette tools 1020 include a graphic selection object 904, a color selector 914, and a color theory selector 924.

Figure 10B:
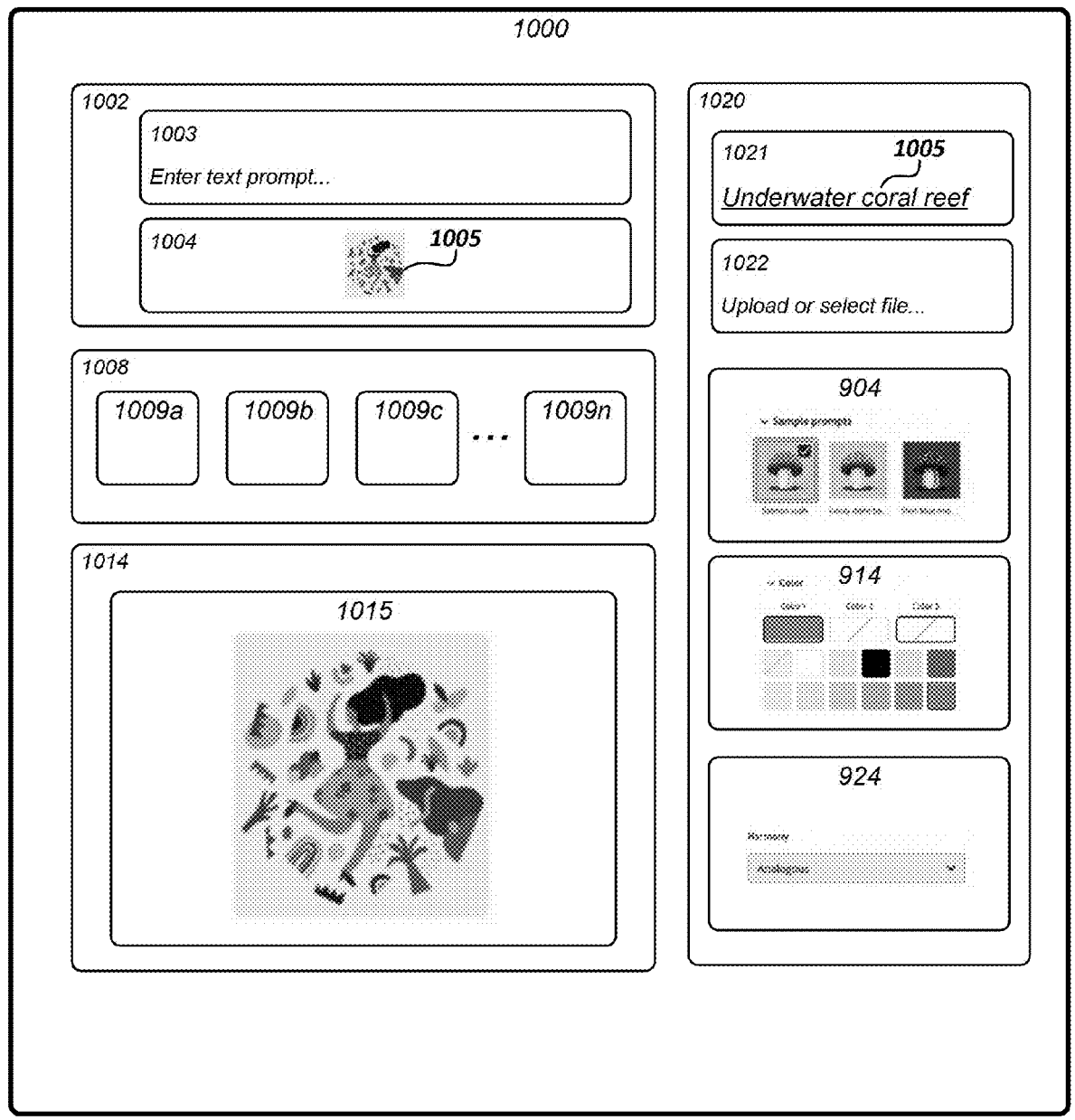

Referring to FIG. 10B, the user has uploaded graphic file 1005. The user interface engine 102 displays a target graphic 1015 associated with the graphic file 1005 in a target graphic display element 1014. Using text input 1021, a text prompt 1005 has been entered by the user specifying an "underwater coral reef" text prompt. The text prompt is processed via the input information processing engine 106, for instance, using a text-to-image tool, to determine a source color palette.

Figure 10C:
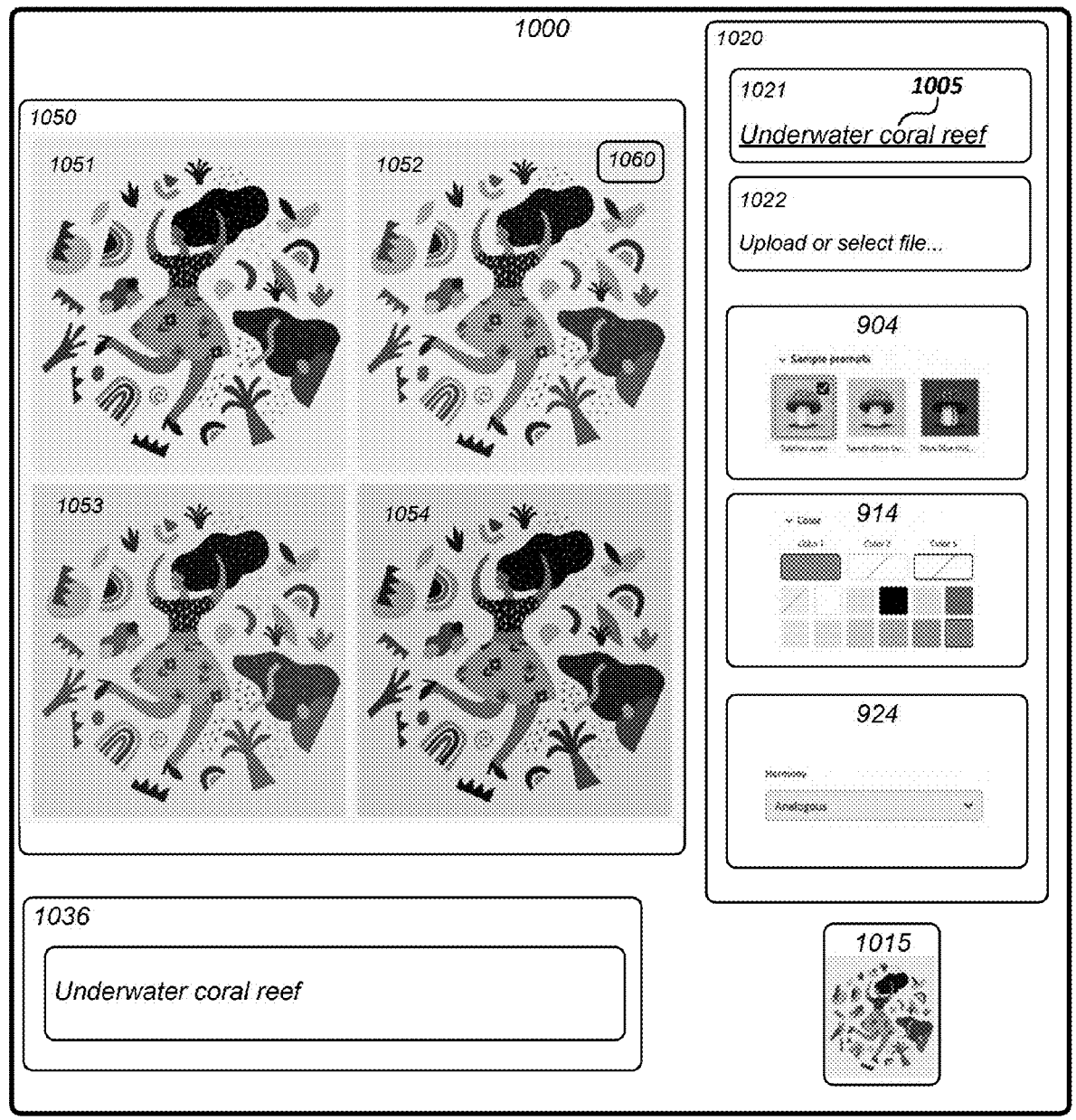

Referring to FIG. 10C, once the target graphic 1015 and the source color palette have been input by the user, the recoloring engine 104 operates to generate a plurality of recolored graphics 1051-1054, which are presented to the user in a recolored graphics display element 1050. Each of the recolored graphics 1051-1054 is generated by recoloring the target graphic 1015 based on the same source color palette, which results in a different set of source colors being mapped to the target colors based on the probabilistic distribution implemented by the destination color palette engine 140 according to various embodiments.

In some embodiments, a source definition element 1036 is presented on the recoloring interface 1000 to present the input used for determining the source color palette. In FIG. 10C, the user has specified the text input "underwater coral reef," which has been used by the recoloring engine 104 to generate the source color palette.

Figure 10D:
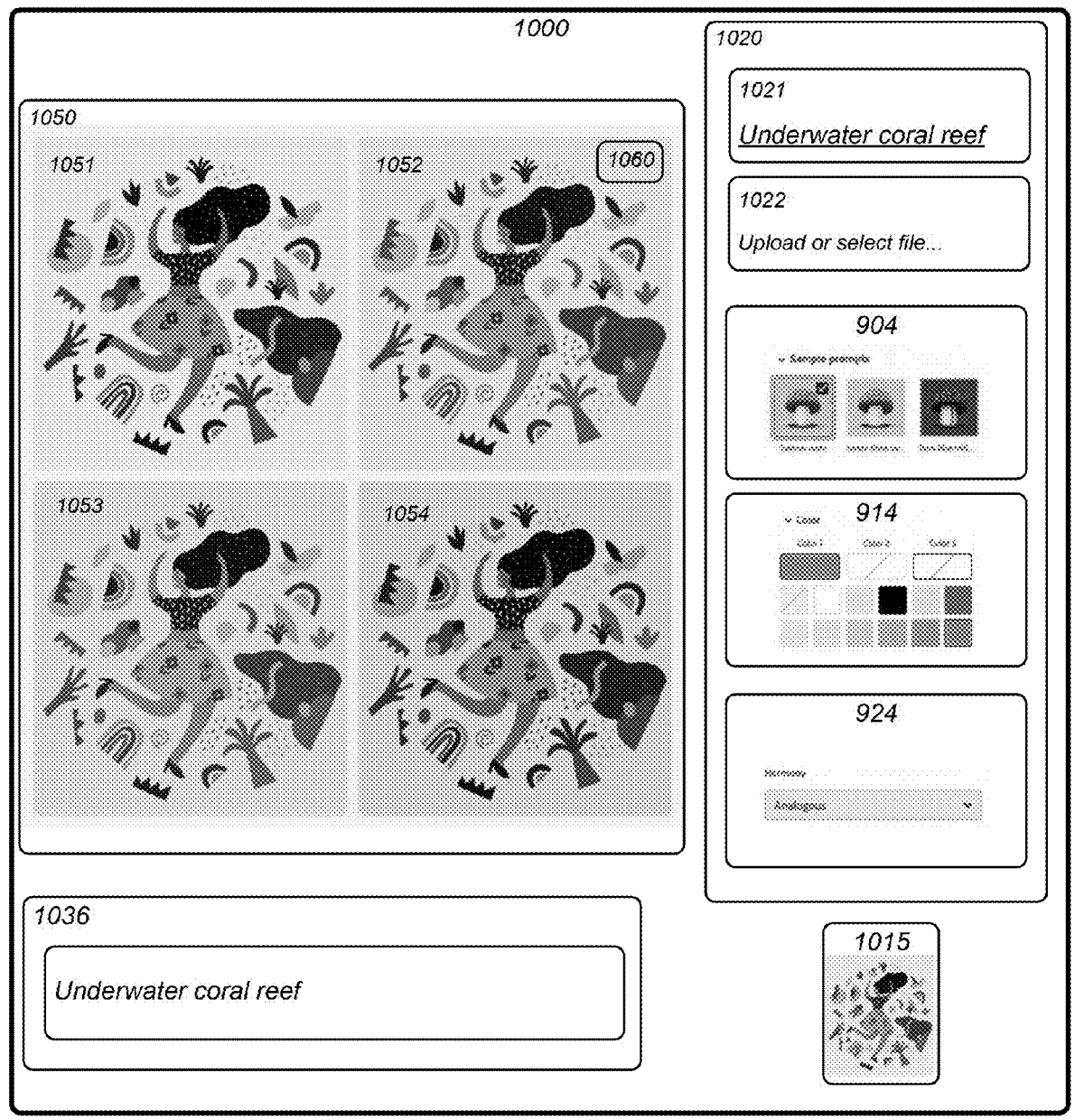

In some embodiments, recoloring interface 1000 may include various modification tools 1060 for modifying the set of recolored graphics 1051-1054. For example, if a user selects or hovers a selection element (e.g., cursor) over a recolored graphic 1051-1054, the modification tool 1060 appears. In one example, the modification tool 1060 is a shuffle tool that causes the recoloring engine 104 to recolor the recolored graphic 1054 with a different set of colors. For example, the reshuffle tool 1060 causes the destination color palette engine 140 to generate a new (clustered) destination color palette, having different source colors based on a different mapping of source colors to target colors changed based on the transition probability. Referring to FIG. 10D, recolored graphic 1052 has been recolored with a new destination color palette.

Figure 10E:
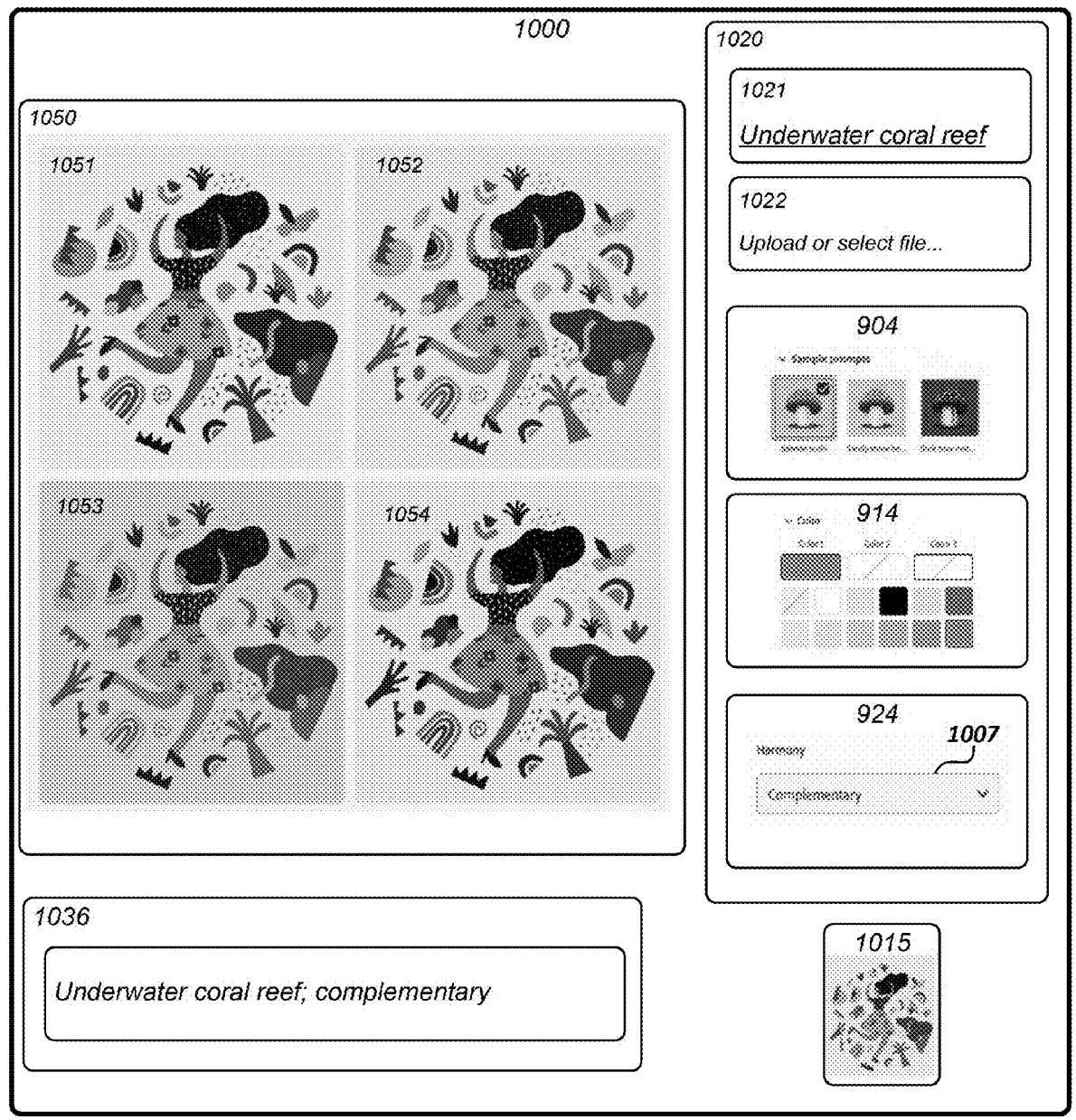

In FIG. 10E, the user has specified a "complimentary" color theory scheme via the color theory selector 924, causing the recoloring engine 104 to generate a new set of color palettes modified according to the "complementary" color theory scheme. Recolored graphics 1051-1054 have been recolored based on the "complimentary" color theory selection 1007. The source definition element 1036 has been updated to reflect that the source color palettes are generated based on the "underwater coral reef" text prompt and "complimentary" color theory scheme.

Figure 10F:
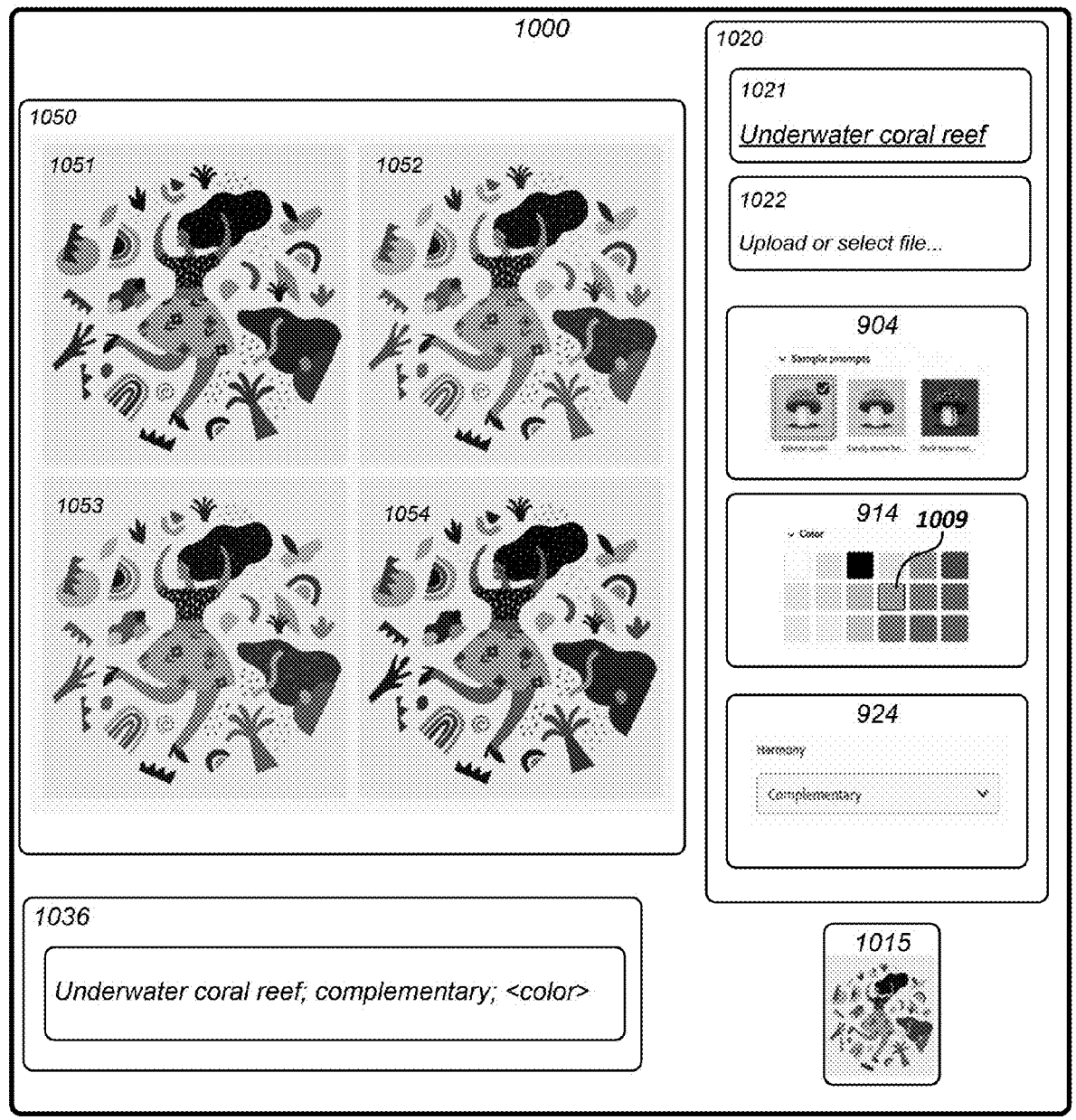

In FIG. 10F, the user has selected the color "orange" via the color selector 914 to include this color in the source color palette, causing the recoloring engine 104 to generate a new set of color palettes modified according to the "orange" color selection. Recolored graphics 1051-1054 have been recolored based on the "orange" color selection. The source definition element 1036 has been updated to reflect that the source color palettes are generated based on the "underwater coral reef" text prompt, "complimentary" color theory scheme, and the "orange" color selection.

The recoloring interface 1000 provides additional user tools that allow a user to save a recolored image, rate the recolored image, etc.

Figure 11:
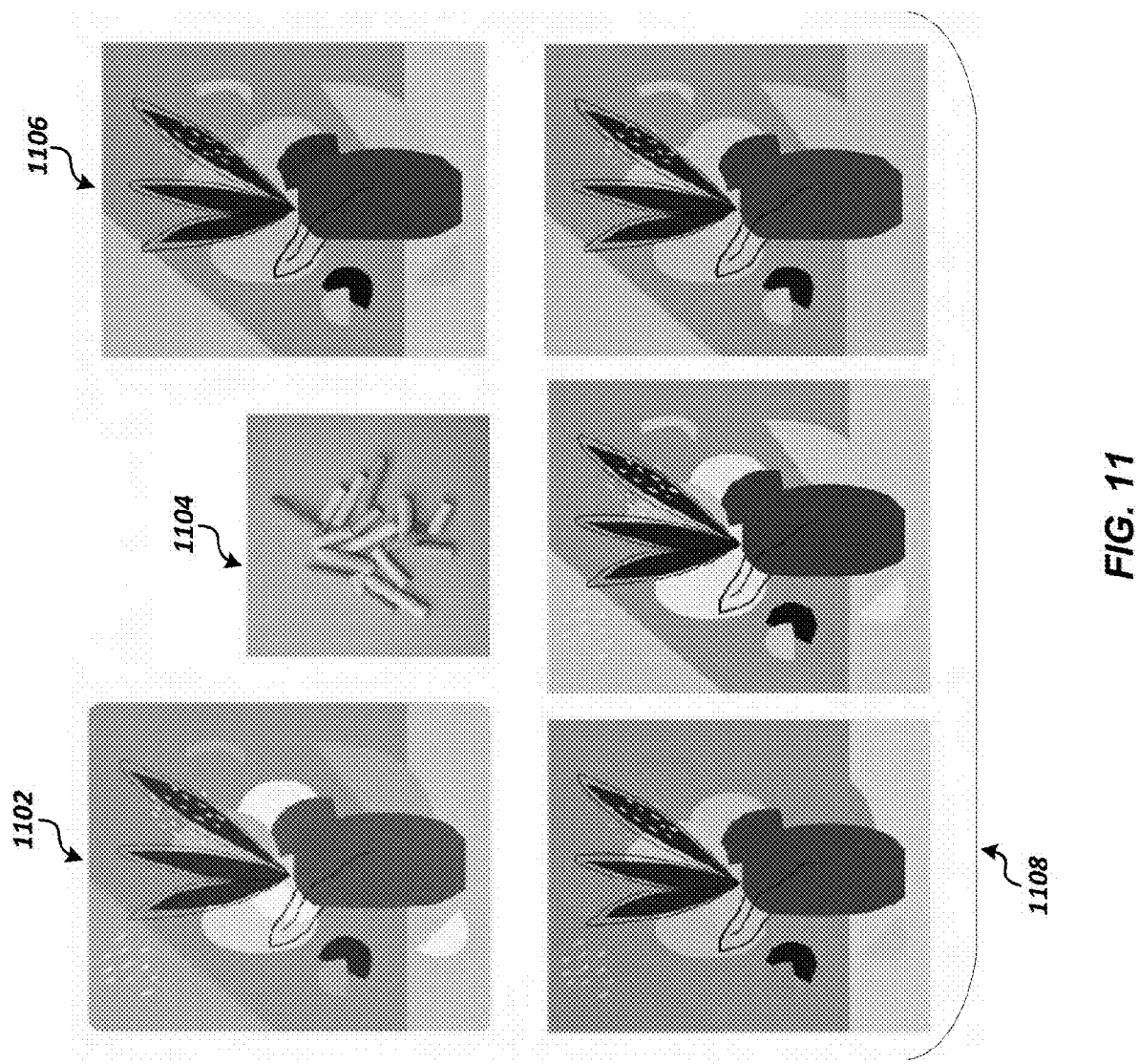
FIG. 11 depicts a first example of illustrative recolored graphics according to some embodiments.

FIG. 11 depicts illustrative recolored graphics 1108 according to some embodiments. As shown in FIG. 11, a source graphic 1102 is recolored using stochastic recoloring processes according to some embodiments based on a source palette 1104 (e.g., based on a "pastels" input prompt) to generate a set of recolored images, each with different color palette variations. Image 1106 depicts an image recolored using conventional EMD-based recoloring processes. As indicated in FIG. 11, stochastic recoloring processes according to some embodiments operate to generate a wider variety of recolored images that are harmonious and more aesthetically pleasing (for instance, with improved color relationships that corresponds closer to the target graphic color relationships, ratios, etc.) than conventional techniques.

Figure 12:
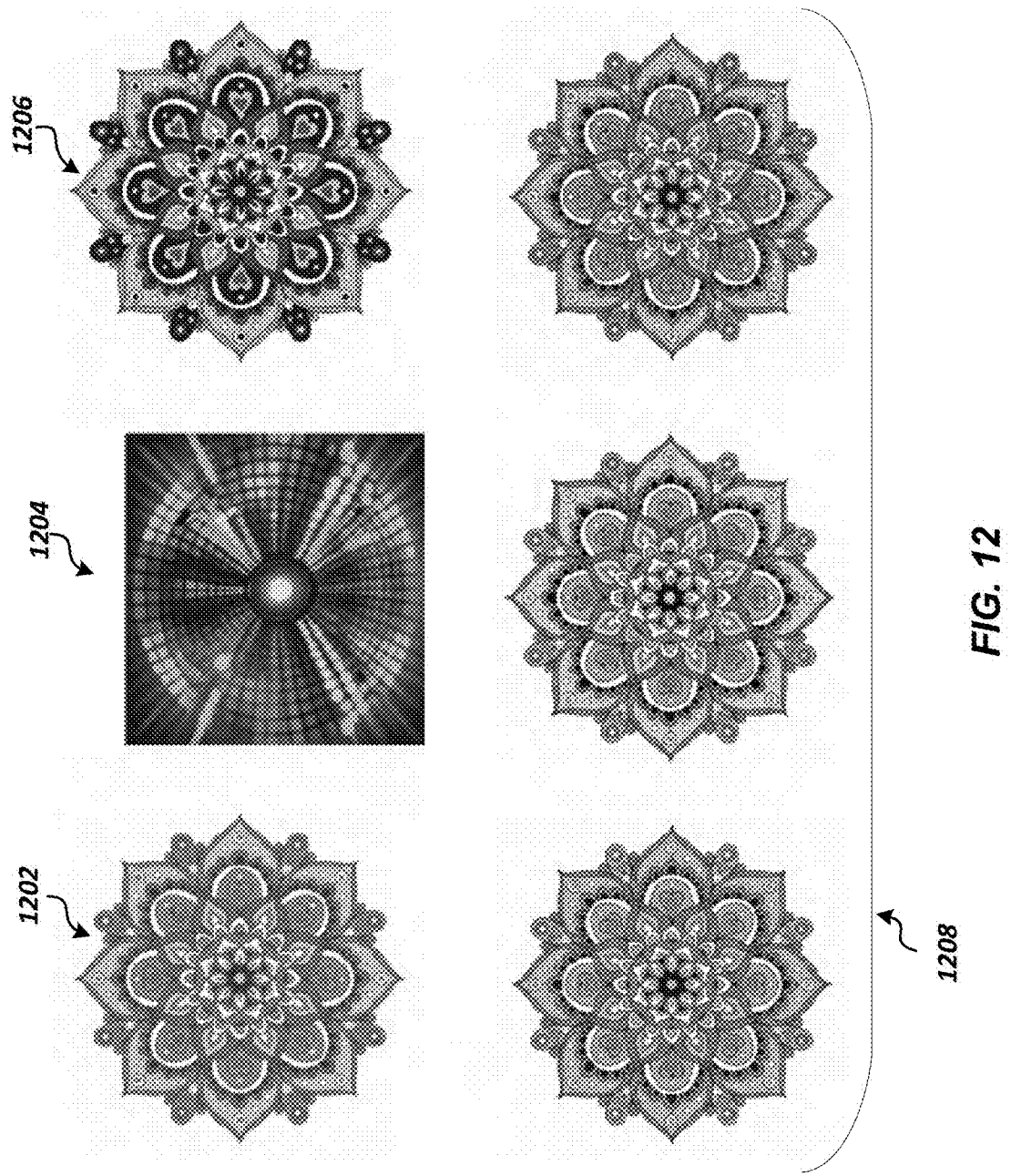
FIG. 12 depicts a second example of illustrative recolored graphics according to some embodiments.

FIG. 12 depicts illustrative recolored graphics according to some embodiments. As shown in FIG. 12, a source graphic 1202 is recolored using stochastic recoloring processes according to some embodiments based on a source palette 1204 (e.g., based on a "trippy disco lights" input prompt) to generate a set of recolored images, each with different color palette variations. Image 1206 depicts an image recolored using conventional EMD-based recoloring processes. As indicated in FIG. 12, stochastic recoloring processes according to some embodiments operate to generate a wider variety of recolored images that are more aesthetically pleasing and harmonious than images recolored using conventional techniques.

Figure 13:
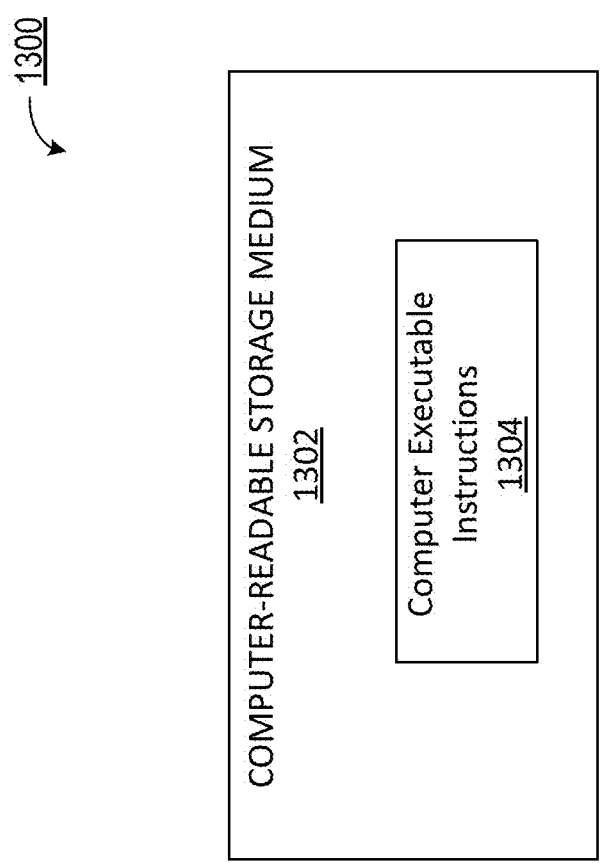
FIG. 13 illustrates a computer-readable storage medium in accordance with one embodiment.

FIG. 13 illustrates an apparatus 1300. Apparatus 1300 comprises any non-transitory computer-readable storage medium 1302 or machine-readable storage medium, such as an optical, magnetic or semiconductor storage medium. In various embodiments, apparatus 1300 comprises an article of manufacture or a product. In some embodiments, the computer-readable storage medium 1302 stores computer executable instructions with which one or more processing devices or processing circuitry can execute. For example, computer executable instructions 1304 includes instructions to implement operations described with respect to any logic flows described herein. Examples of computer-readable storage medium 1302 or machine-readable storage medium include any tangible media capable of storing electronic data, including volatile memory or non-volatile memory, removable or non-removable memory, erasable or non-erasable memory, writeable or re-writeable memory, and so forth. Examples of computer executable instructions 1304 include any suitable type of code, such as source code, compiled code, interpreted code, executable code, static code, dynamic code, object-oriented code, visual code, and the like.

Figure 14:
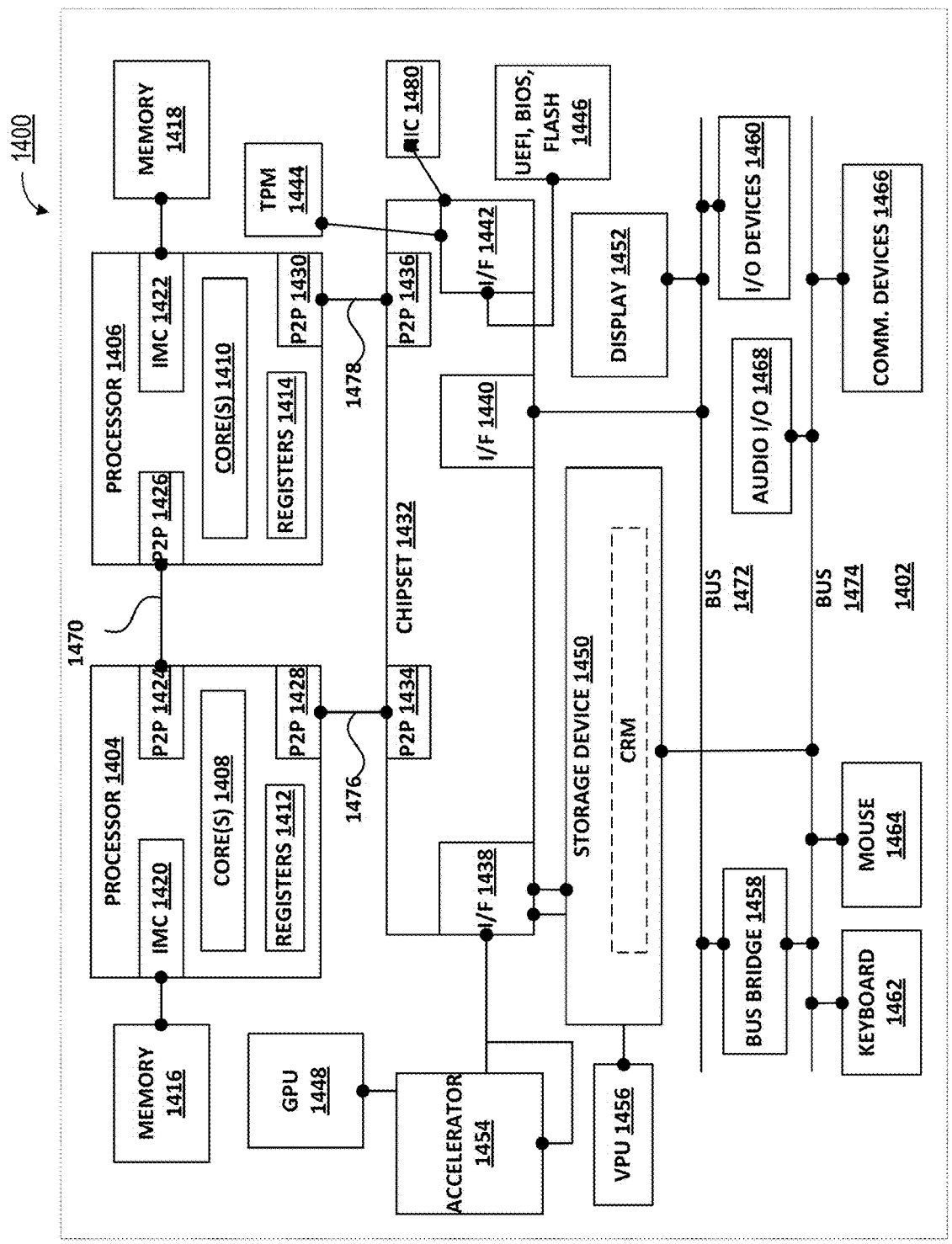
FIG. 14 illustrates a computing architecture in accordance with one embodiment.

FIG. 14 illustrates an embodiment of a computing architecture 1400. Computing architecture 1400 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 1400 has a single processor with one core or more than one processor. Note that the term "processor" refers to a processor with a single core or a processor package with multiple processor cores. In at least one embodiment, the computing architecture 1400 is representative of the components of the system 100. More generally, the computing architecture 1400 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 1400. For example, a component is, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server are a component. One or more components reside within a process and/or thread of execution, and a component is localized on one computer and/or distributed between two or more computers. Further, components are communicatively coupled to each other by various types of communications media to coordinate operations. The coordination involves the uni-directional or bi-directional exchange of information. For instance, the components communicate information in the form of signals communicated over the communications media. The information is implemented as signals allocated to various signal lines. In such allocations, each message is a signal. Further embodiments, however, alternatively employ data messages. Such data messages may be sent across various connections. Exemplary connections include parallel interfaces, serial interfaces, and bus interfaces.

As shown in FIG. 14, computing architecture 1400 comprises a system-on-chip (SoC) 1402 for mounting platform components. System-on-chip (SoC) 1402 is a point-to-point (P2P) interconnect platform that includes a first processor 1404 and a second processor 1406 coupled via a point-to-point interconnect 1470 such as an Ultra Path Interconnect (UPI). In other embodiments, the computing architecture 1400 is another bus architecture, such as a multi-drop bus. Furthermore, each of processor 1404 and processor 1406 are processor packages with multiple processor cores including core(s) 1408 and core(s) 1410, respectively. While the computing architecture 1400 is an example of a two-socket (2S) platform, other embodiments include more than two sockets or one socket. For example, some embodiments include a four-socket (4S) platform or an eight-socket (8S) platform. Each socket is a mount for a processor and may have a socket identifier. Note that the term platform refers to a motherboard with certain components mounted such as the processor 1404 and chipset 1432. Some platforms include additional components and some platforms include sockets to mount the processors and/or the chipset. Furthermore, some platforms do not have sockets (e.g., SoC, or the like). Although depicted as a SoC 1402, one or more of the components of the SoC 1402 are included in a single die package, a multi-chip module (MCM), a multi-die package, a chiplet, a bridge, and/or an interposer. Therefore, embodiments are not limited to a SoC.

The processor 1404 and processor 1406 are any commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures are also employed as the processor 1404 and/or processor 1406. Additionally, the processor 1404 need not be identical to processor 1406.

Processor 1404 includes an integrated memory controller (IMC) 1420 and point-to-point (P2P) interface 1424 and P2P interface 1428. Similarly, the processor 1406 includes an IMC 1422 as well as P2P interface 1426 and P2P interface 1430. IMC 1420 and IMC 1422 couple the processor 1404 and processor 1406, respectively, to respective memories (e.g., memory 1416 and memory 1418). Memory 1416 and memory 1418 are portions of the main memory (e.g., a dynamic random-access memory (DRAM)) for the platform such as double data rate type 4 (DDR4) or type 5 (DDR5) synchronous DRAM (SDRAM). In the present embodiment, the memory 1416 and the memory 1418 locally attach to the respective processors (i.e., processor 1404 and processor 1406). In other embodiments, the main memory couple with the processors via a bus and shared memory hub. Processor 1404 includes registers 1412 and processor 1406 includes registers 1414.

Computing architecture 1400 includes chipset 1432 coupled to processor 1404 and processor 1406. Furthermore, chipset 1432 are coupled to storage device 1450, for example, via an interface (I/F) 1438. The I/F 1438 may be, for example, a Peripheral Component Interconnect-enhanced (PCIe) interface, a Compute Express Link® (CXL) interface, or a Universal Chiplet Interconnect Express (UCIe) interface. Storage device 1450 stores instructions executable by circuitry of computing architecture 1400 (e.g., processor 1404, processor 1406, GPU 1448, accelerator 1454, vision processing unit 1456, or the like). For example, storage device 1450 can store instructions for the user interface engine 102, the recoloring engine 104, or the like.

Processor 1404 couples to the chipset 1432 via P2P interface 1428 and P2P 1434 while processor 1406 couples to the chipset 1432 via P2P interface 1430 and P2P 1436. Direct media interface (DMI) 1476 and DMI 1478 couple the P2P interface 1428 and the P2P 1434 and the P2P interface 1430 and P2P 1436, respectively. DMI 1476 and DMI 1478 is a high-speed interconnect that facilitates, e.g., eight Giga Transfers per second (GT/s) such as DMI 3.0. In other embodiments, the processor 1404 and processor 1406 interconnect via a bus.

The chipset 1432 comprises a controller hub such as a platform controller hub (PCH). The chipset 1432 includes a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 1432 comprises more than one controller hub such as a chipset with a memory controller hub, a graphics controller hub, and an input/output (I/O) controller hub.

In the depicted example, chipset 1432 couples with a trusted platform module (TPM) 1444 and UEFI, BIOS, FLASH circuitry 1446 via I/F 1442. The TPM 1444 is a dedicated microcontroller designed to secure hardware by integrating cryptographic keys into devices. The UEFI, BIOS, FLASH circuitry 1446 may provide pre-boot code. The I/F 1442 may also be coupled to a network interface circuit (NIC) 1480 for connections off-chip.

Furthermore, chipset 1432 includes the I/F 1438 to couple chipset 1432 with a high-performance graphics engine, such as, graphics processing circuitry or a graphics processing unit (GPU) 1448. In other embodiments, the computing architecture 1400 includes a flexible display interface (FDI) (not shown) between the processor 1404 and/or the processor 1406 and the chipset 1432. The FDI interconnects a graphics processor core in one or more of processor 1404 and/or processor 1406 with the chipset 1432.

The computing architecture 1400 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication is a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network is used to connect computers to each other, to the Internet, and to wired networks (which use IEEE 802.3-related media and functions).

Additionally, accelerator 1454 and/or vision processing unit 1456 are coupled to chipset 1432 via I/F 1438. The accelerator 1454 is representative of any type of accelerator device (e.g., a data streaming accelerator, cryptographic accelerator, cryptographic co-processor, an offload engine, etc.). One example of an accelerator 1454 is the Intel® Data Streaming Accelerator (DSA). The accelerator 1454 is a device including circuitry to accelerate copy operations, data encryption, hash value computation, data comparison operations (including comparison of data in memory 1416 and/or memory 1418), and/or data compression. Examples for the accelerator 1454 include a USB device, PCI device, PCIe device, CXL device, UCIe device, and/or an SPI device. The accelerator 1454 also includes circuitry arranged to execute machine learning (ML) related operations (e.g., training, inference, etc.) for ML models. Generally, the accelerator 1454 is specially designed to perform computationally intensive operations, such as hash value computations, comparison operations, cryptographic operations, and/or compression operations, in a manner that is more efficient than when performed by the processor 1404 or processor 1406. Because the load of the computing architecture 1400 includes hash value computations, comparison operations, cryptographic operations, and/or compression operations, the accelerator 1454 greatly increases performance of the computing architecture 1400 for these operations.

The accelerator 1454 includes one or more dedicated work queues and one or more shared work queues (each not pictured). Generally, a shared work queue is configured to store descriptors submitted by multiple software entities. The software is any type of executable code, such as a process, a thread, an application, a virtual machine, a container, a microservice, etc., that share the accelerator 1454. For example, the accelerator 1454 is shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 1454 via a non-posted write (e.g., a deferred memory write (DMWr)). One example of an instruction that atomically submits a work descriptor to the shared work queue of the accelerator 1454 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator 1454. The dedicated work queue may accept job submissions via commands such as the movdir64b instruction.

Various I/O devices 1460 and display 1452 couple to the bus 1472, along with a bus bridge 1458 which couples the bus 1472 to a second bus 1474 and an I/F 1440 that connects the bus 1472 with the chipset 1432. In one embodiment, the second bus 1474 is a low pin count (LPC) bus. Various input/output (I/O) devices couple to the second bus 1474 including, for example, a keyboard 1462, a mouse 1464 and communication devices 1466.

Furthermore, an audio I/O 1468 couples to second bus 1474. Many of the I/O devices 1460 and communication devices 1466 reside on the system-on-chip (SoC) 1402 while the keyboard 1462 and the mouse 1464 are add-on peripherals. In other embodiments, some or all the I/O devices 1460 and communication devices 1466 are add-on peripherals and do not reside on the system-on-chip (SoC) 1402.

Figure 15:
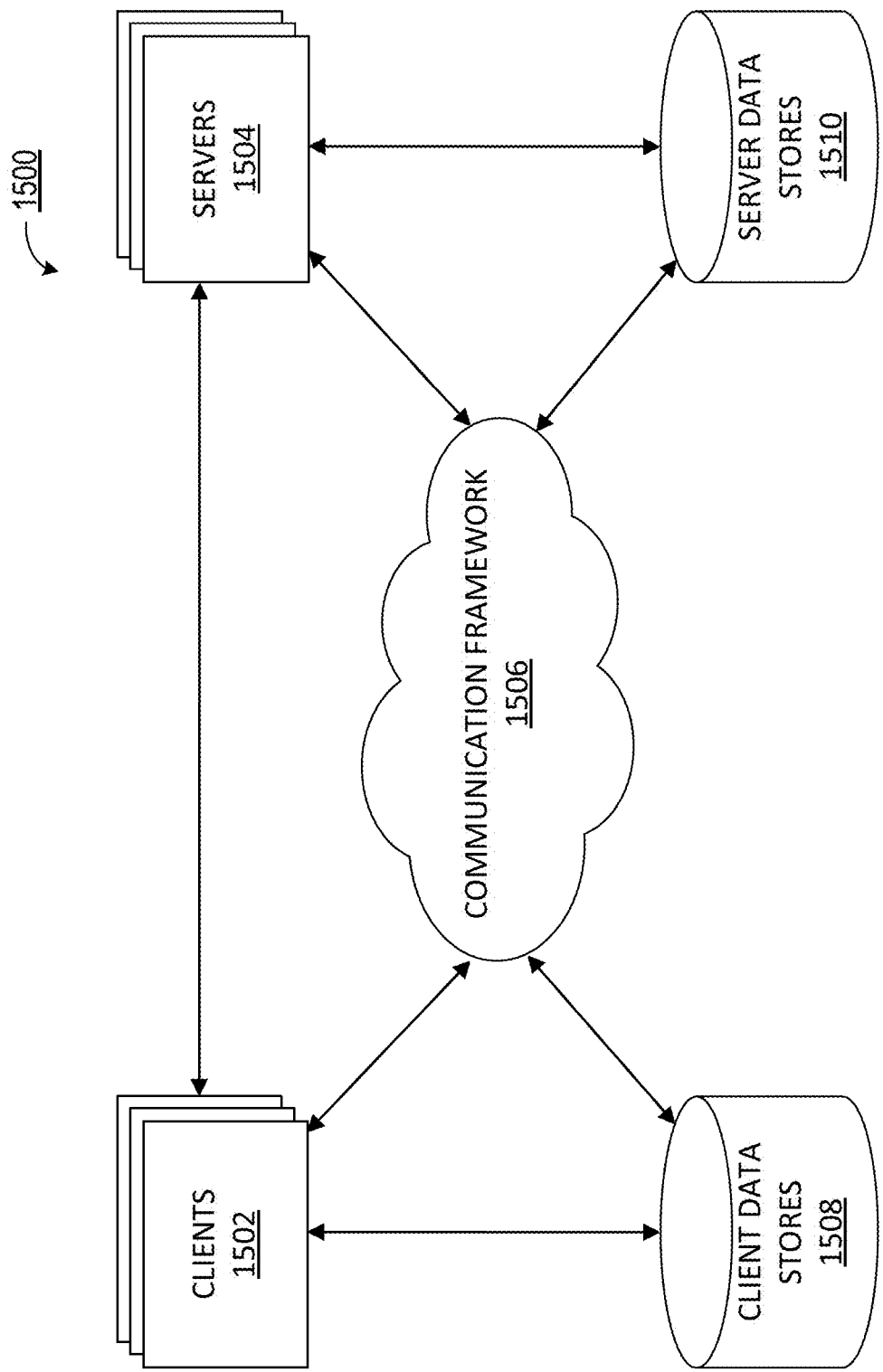
FIG. 15 illustrates a communications architecture in accordance with one embodiment.

FIG. 15 illustrates a block diagram of an exemplary communications architecture 1500 suitable for implementing various embodiments as previously described. The communications architecture 1500 includes various common communications elements, such as a transmitter, receiver, transceiver, radio, network interface, baseband processor, antenna, amplifiers, filters, power supplies, and so forth. The embodiments, however, are not limited to implementation by the communications architecture 1500.

As shown in FIG. 15, the communications architecture 1500 includes one or more clients 1502 and servers 1504. The clients 1502 and the servers 1504 are operatively connected to one or more respective client data stores 1508 and server data stores 1510 that can be employed to store information local to the respective clients 1502 and servers 1504, such as cookies and/or associated contextual information.

The clients 1502 and the servers 1504 communicate information between each other using a communication framework 1506. The communication framework 1506 implements any well-known communications techniques and protocols. The communication framework 1506 is implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 1506 implements various network interfaces arranged to accept, communicate, and connect to a communications network. A network interface is regarded as a specialized form of an input output interface. Network interfaces employ connection protocols including without limitation direct connect, Ethernet (e.g., thick, thin, twisted pair 10/2100/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces are used to engage with various communications network types. For example, multiple network interfaces are employed to allow for the communication over broadcast, multicast, and unicast networks. Should processing requirements dictate a greater amount speed and capacity, distributed network controller architectures are similarly employed to pool, load balance, and otherwise increase the communicative bandwidth required by clients 1502 and the servers 1504. A communications network is any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The various elements of the devices as previously described with reference to the figures include various hardware elements, software elements, or a combination of both. Examples of hardware elements include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements varies in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment are implemented by representative instructions stored on a machine-readable medium which represents various logic within the processor, which when read by a machine causes the machine to fabricate logic to perform the techniques described herein. Such representations, known as "intellectual property (IP) cores" are stored on a tangible, machine readable medium and supplied to various customers or manufacturing facilities to load into the fabrication machines that make the logic or processor. Some embodiments are implemented, for example, using a machine-readable medium or article which may store an instruction or a set of instructions that, when executed by a machine, causes the machine to perform a method and/or operations in accordance with the embodiments. Such a machine includes, for example, any suitable processing platform, computing platform, computing device, processing device, computing system, processing system, processing devices, computer, processor, or the like, and is implemented using any suitable combination of hardware and/or software. The machine-readable medium or article includes, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions include any suitable type of code, such as source code, compiled code, interpreted code, executable code, static code, dynamic code, encrypted code, and the like, implemented using any suitable high-level, low-level, object-oriented, visual, compiled and/or interpreted programming language.

As utilized herein, terms "component," "system," "interface," and the like are intended to refer to a computer-related entity, hardware, software (e.g., in execution), and/or firmware. For example, a component is a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server is also a component. One or more components reside within a process, and a component is localized on one computer and/or distributed between two or more computers. A set of elements or a set of other components are described herein, in which the term "set" can be interpreted as "one or more."

Further, these components execute from various computer readable storage media having various data structures stored thereon such as with a module, for example. The components communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component is an apparatus with specific functionality provided by mechanical parts operated by electric or electronic circuitry, in which the electric or electronic circuitry is operated by a software application or a firmware application executed by one or more processors. The one or more processors are internal or external to the apparatus and execute at least a part of the software or firmware application. As yet another example, a component is an apparatus that provides specific functionality through electronic components without mechanical parts; the electronic components include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description or the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry is implemented in, or functions associated with the circuitry are implemented by, one or more software or firmware modules. In some embodiments, circuitry includes logic, at least partially operable in hardware. It is noted that hardware, firmware and/or software elements may be collectively or individually referred to herein as "logic" or "circuit."

Some embodiments are described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately can be employed in combination with each other unless it is noted that the features are incompatible with each other.

Some embodiments are presented in terms of program procedures executed on a computer or network of computers. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments are described using the expression "coupled" and "connected" along with their derivatives. These terms are not necessarily intended as synonyms for each other. For example, some embodiments are described using the terms "connected" and/or "coupled" to indicate that two or more elements are in direct physical or electrical contact with each other. The term "coupled," however, also means that two or more elements are not in direct contact with each other, but yet still co-operate or interact with each other.

Various embodiments also relate to apparatus or systems for performing these operations. This apparatus is specially constructed for the required purpose or it comprises a general purpose computer as selectively activated or reconfigured by a computer program stored in the computer. The procedures presented herein are not inherently related to a particular computer or other apparatus. Various general purpose machines are used with programs written in accordance with the teachings herein, or it proves convenient to construct more specialized apparatus to perform the required method steps. The required structure for a variety of these machines are apparent from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The following examples pertain to further embodiments, from which numerous permutations and configurations will be apparent.

In one example, a method includes accessing a target color set comprising target colors extracted from a target graphic, and a source color palette defining source colors for recoloring the target graphic; computing a mapping to map the source colors to the target colors based on a transition probability computed by minimizing an amount of work required to transform a source color distribution of the source color palette into a target color distribution of the target color set; determining a destination color palette of destination colors based on the mapping by exchanging each of the target colors with one of the source colors stochastically selected based on the transition probability; and modifying the target graphic by recoloring at least one object in the target graphic with a destination color from the destination color palette.

In another example, a method includes obtaining a target graphic to be recolored, obtaining a source color palette defining source colors for recoloring the target graphic, extracting a target color set comprising target colors from a target graphic, computing a mapping to map the source colors to the target colors based on a transition probability, determining a destination color palette of destination colors based on the mapping, and modifying the target graphic by recoloring at least one object in the target graphic with a destination color from the destination color palette.

In some examples of the method, the transition probability is computed by minimizing an amount of work required to transform a source color distribution of the source color palette into a target color distribution of the target color set.

In some examples of the method, the destination color palette is determined based on the mapping by exchanging each of the target colors with one of the source colors stochastically selected based on the transition probability.

In some examples of the method, the target color palette includes a clustered color palette generated by clustering the target color set via: segmenting the target colors into at least one cluster based on a relationship of at least one color property of the target colors, and determining a cluster color to represent the at least one cluster, the cluster color determined as an average of the colors segmented into the at least one cluster.

In some examples of the method, the at least one color property includes a hue value and a lightness value.

In some examples of the method, segmenting the target colors into the clustered color palette includes, for each target color: comparing the at least one color property of the target color and one or more segmented colors assigned to an active cluster; adding the target color to the active cluster if the at least one color property of the target color and the one or more segmented colors is within a predefined threshold; and initializing a new cluster and adding the target color to the new cluster if the at least one color property of the target color and the one or more segmented colors is not within the predefined threshold.

In some examples of the method, the method includes generating a de-clustered destination color palette by de-clustering the destination color palette, prior to recoloring the target graphic, via, for each original target color associated with the destination color palette: determining at least one color property difference value based on a difference of the at least one color property of the original target color and a corresponding cluster color determined for a cluster of the clustered color palette; transforming the original target color to a modified color based on the at least one color property difference and the at least one color property of the corresponding destination color assigned to the cluster; and adding the modified color to the de-clustered destination color palette.

In some examples of the method, computing the transition probability is based on a uniform randomness factor configured to facilitate randomization of the colors of the destination color palette by giving a non-zero probability to each color of the source color palette.

In some examples of the method, computing the transition probability comprises dividing a minimum cost of a minimized amount of work required to transform the source color distribution into the target color distribution by a sum of a minimized amount of work required to transform a modified source color distribution into the target color distribution, modified by the uniform randomness factor.

In some examples of the method, the transition probability is determined based on minimizing an earth mover distance (EMD).

In one example, a non-transitory computer-readable medium stores executable instructions, which when executed by one or more processing devices, cause the one or more processing devices to perform operations including: determining a clustered color palette via clustering target colors extracted from a target graphic; determining a destination color palette by exchanging each color of the clustered color palette with one of a plurality of source colors stochastically selected based on a randomized transition probability computed as a probability of selecting a particular color of the plurality of source colors to replace a color of the clustered color palette; determining a de-clustered color set via de-clustering the destination color palette; and modifying the target graphic by recoloring at least one object in the target graphic with a color from the destination color palette.

In another example, a non-transitory computer-readable medium stores executable instructions, which when executed by one or more processing devices, cause the one or more processing devices to perform operations including: obtaining a target graphic to be recolored, obtaining source colors for recoloring the target graphic, determining a clustered color palette via clustering target colors extracted from the target graphic, determining a destination color palette by exchanging each color of the clustered color palette with one of a plurality of source colors stochastically selected based on a randomized transition probability, determining a de-clustered color set via de-clustering the destination color palette, and modifying the target graphic by recoloring at least one object in the target graphic with a color from the destination color palette.

In some examples of the non-transitory computer-readable medium, the randomized transition probability is computed as a probability of selecting a particular color of the plurality of source colors to replace a color of the clustered color palette.

In some examples of the non-transitory computer-readable medium, the executable instructions, when executed by the one or more processing devices, cause the one or more processing devices to perform operations including: determining the transition probability based on minimizing an earth mover distance (EMD) for transforming a first color distribution of the clustered color palette into a second color distribution of the plurality of source colors.

In some examples of the non-transitory computer-readable medium, computing the transition probability is based on a uniform randomness factor configured to facilitate randomization of the colors of the destination color palette by giving a non-zero probability to each color of the source color palette.

In some examples of the non-transitory computer-readable medium, the uniform randomness factor is determined based on a weight of each color in the target colors to correspond with an amount of each color in the target graphic.

In some examples of the non-transitory computer-readable medium, the executable instructions, when executed by the one or more processing devices, cause the one or more processing devices to perform operations including: segmenting the target colors into at least one cluster based on a relationship of at least one color property of the target colors; and determining a cluster color to represent the at least one cluster, the cluster color determined as an average of the colors segmented into the at least one cluster.

In some examples of the non-transitory computer-readable medium, segmenting the target colors into the clustered color palette comprises, for each target color: comparing the at least one color property of the target color and one or more segmented colors assigned to an active cluster; adding the target color to the active cluster if the at least one color property of the target color and the one or more segmented colors is within a predefined threshold; and initializing a new cluster and adding the target color to the new cluster if the at least one color property of the target color and the one or more segmented colors is not within the predefined threshold.

In some examples of the non-transitory computer-readable medium, the executable instructions, when executed by the one or more processing devices, cause the one or more processing devices to perform operations including, for each original target color associated with the destination color palette: determining at least one color property difference value based on a difference of the at least one color property of the original target color and a corresponding cluster color determined for a cluster of the clustered color palette; transforming the original target color to a modified color based on the at least one color property difference and the at least one color property of a corresponding destination color assigned to the cluster; and adding the modified color to the de-clustered destination color palette.

In one example, a system includes: a memory component; and one or more processing devices coupled to the memory component, the one or more processing devices to perform operations including: accessing a target color set comprising target colors extracted from a target graphic, and a source color palette defining source colors for recoloring the target graphic; computing a mapping to map the source colors to the target colors based on a transition probability computed by minimizing an earth mover distance (EMD) of transforming a source color distribution of the source color palette into a target color distribution of the target color set, modified by a randomization factor; determining a destination color palette of destination colors based on the mapping by exchanging each of the target colors with one of the source colors stochastically selected based on the transition probability; and modifying the target graphic by recoloring at least one object in the target graphic with a destination color from the destination color palette.

In another example, a system includes: a memory component; and one or more processing devices coupled to the memory component, the one or more processing devices to perform operations including: obtaining a target graphic to be recolored, obtaining a source color palette defining source colors for recoloring the target graphic, extracting a target color set comprising target colors from a target graphic, computing a mapping to map the source colors to the target colors based on a transition probability computed by minimizing an earth mover distance (EMD) of transforming a source color distribution of the source color palette into a target color distribution of the target color set, modified by a randomization factor, determining a destination color palette of destination colors based on the mapping, and modifying the target graphic by recoloring at least one object in the target graphic with a destination color from the destination color palette In some examples of the system, the destination color palette is determined based on the mapping by exchanging each of the target colors with one of the source colors stochastically selected based on the transition probability.

In some examples of the system, the target color palette includes a clustered color palette generated by clustering the target color set via: segmenting the target colors into at least one cluster based on a relationship of at least one color property of the target colors, and determining a cluster color to represent the at least one cluster, the cluster color determined as an average of the colors segmented into the at least one cluster.

In some examples of the system, segmenting the target colors into the clustered color palette includes, for each target color: comparing the at least one color property of the target color and one or more segmented colors assigned to an active cluster; adding the target color to the active cluster if the at least one color property of the target color and the one or more segmented colors is within a predefined threshold; and initializing a new cluster and adding the target color to the new cluster if the at least one color property of the target color and the one or more segmented colors is not within the predefined threshold.

In some examples of the system, the one or more processing devices perform operations that include generating a de-clustered destination color palette via de-clustering the destination color palette, prior to recoloring the target graphic, for each original target color associated with the destination color palette: determining at least one color property difference value based on a difference of the at least one color property of the original target color and a corresponding cluster color determined for a cluster of the clustered color palette; transforming the original target color to a modified color based on the at least one color property difference and the at least one color property of the corresponding destination color assigned to the cluster; and adding the modified color to the de-clustered destination color palette.

In some examples of the system, computing the transition probability is based on a uniform randomness factor configured to facilitate randomization of the colors of the destination color palette by giving a non-zero probability to each color of the source color palette.

What is claimed is:

1. A method, comprising:
   obtaining a target graphic to be recolored;
   obtaining a source color palette defining source colors for recoloring the target graphic;
   extracting a target color set comprising target colors from a target graphic;
   computing a mapping to map the source colors to the target colors based on a transition probability;
   determining a destination color palette of destination colors based on the mapping;
   modifying the target graphic by recoloring at least one object in the target graphic with a destination color from the destination color palette; and
   causing display of the recolored target graphic on a graphical user interface (GUI).

2. The method of claim 1, wherein the transition probability is computed by minimizing an amount of work required to transform a source color distribution of the source color palette into a target color distribution of the target color set.

3. The method of claim 1, wherein the destination color palette is determined based on the mapping by exchanging each of the target colors with one of the source colors stochastically selected based on the transition probability.

4. The method of claim 1, wherein the target color palette comprises a clustered color palette generated by clustering the target color set via:
   segmenting the target colors into at least one cluster based on a relationship of at least one color property of the target colors, and
   determining a cluster color to represent the at least one cluster, the cluster color determined as an average of the colors segmented into the at least one cluster.

5. The method of claim 4, wherein segmenting the target colors into the clustered color palette comprises, for each target color:
   comparing the at least one color property of the target color and one or more segmented colors assigned to an active cluster;
   adding the target color to the active cluster if the at least one color property of the target color and the one or more segmented colors is within a predefined threshold; and
   initializing a new cluster and adding the target color to the new cluster if the at least one color property of the target color and the one or more segmented colors is not within the predefined threshold.

6. The method of claim 5, further comprising generating a de-clustered destination color palette by de-clustering the destination color palette, prior to recoloring the target graphic, via, for each original target color associated with the destination color palette:
   determining at least one color property difference value based on a difference of the at least one color property of the original target color and a corresponding cluster color determined for a cluster of the clustered color palette;

transforming the original target color to a modified color based on the at least one color property difference and the at least one color property of the corresponding destination color assigned to the cluster; and adding the modified color to the de-clustered destination color palette.

7. The method of claim 1, wherein computing the transition probability is based on a uniform randomness factor configured to facilitate randomization of the colors of the destination color palette by giving a non-zero probability to each color of the source color palette.

8. The method of claim 1, wherein the transition probability is determined based on minimizing an earth mover distance (EMD).

9. A non-transitory computer-readable medium storing executable instructions, which when executed by one or more processing devices, cause the one or more processing devices to perform operations comprising:

obtaining a target graphic to be recolored;

obtaining source colors for recoloring the target graphic;

determining a clustered color palette via clustering target colors extracted from the target graphic;

determining a destination color palette by exchanging each color of the clustered color palette with one of a plurality of source colors stochastically selected based on a randomized transition probability;

determining a de-clustered color set via de-clustering the destination color palette; and modifying the target graphic by recoloring at least one object in the target graphic with a color from the destination color palette.

10. The non-transitory computer-readable medium of claim 9, wherein the randomized transition probability is computed as a probability of selecting a particular color of the plurality of source colors to replace a color of the clustered color palette.

11. The non-transitory computer-readable medium of claim 9, the executable instructions, when executed by the one or more processing devices, causing the one or more processing devices to perform operations comprising:

determining the transition probability based on minimizing an earth mover distance (EMD) for transforming a first color distribution of the clustered color palette into a second color distribution of the plurality of source colors.

12. The non-transitory computer-readable medium of claim 9, wherein computing the transition probability uses a uniform randomness factor determined based on a weight of each color in the target colors configured to correspond with an amount of each color in the target graphic.

13. The non-transitory computer-readable medium of claim 9, the executable instructions, when executed by the one or more processing devices, causing the one or more processing devices to perform operations for clustering comprising:

segmenting the target colors into at least one cluster based on a relationship of at least one color property of the target colors; and determining a cluster color to represent the at least one cluster, the cluster color determined as an average of the colors segmented into the at least one cluster.

14. The non-transitory computer-readable medium of claim 13, wherein segmenting the target colors into the clustered color palette comprises, for each target color:

comparing the at least one color property of the target color and one or more segmented colors assigned to an active cluster;

adding the target color to the active cluster if the at least one color property of the target color and the one or more segmented colors is within a predefined threshold; and initializing a new cluster and adding the target color to the new cluster if the at least one color property of the target color and the one or more segmented colors is not within the predefined threshold.

15. The non-transitory computer-readable medium of claim 14, the executable instructions, when executed by the one or more processing devices, causing the one or more processing devices to perform operations for clustering comprising, for each original target color associated with the destination color palette:

determining at least one color property difference value based on a difference of the at least one color property of the original target color and a corresponding cluster color determined for a cluster of the clustered color palette;

transforming the original target color to a modified color based on the at least one color property difference and the at least one color property of a corresponding destination color assigned to the cluster; and adding the modified color to the de-clustered destination color palette.

16. A system, comprising:

a memory component; and one or more processing devices coupled to the memory component, the one or more processing devices to perform operations comprising:

obtaining a target graphic to be recolored;

obtaining a source color palette defining source colors for recoloring the target graphic;

extracting a target color set comprising target colors from a target graphic;

computing a mapping to map the source colors to the target colors based on a transition probability computed by minimizing an earth mover distance (EMD) of transforming a source color distribution of the source color palette into a target color distribution of the target color set, modified by a randomization factor;

determining a destination color palette of destination colors based on the mapping; and modifying the target graphic by recoloring at least one object in the target graphic with a destination color from the destination color palette.

17. The system of claim 16, wherein the destination color palette is determined based on the mapping by exchanging each of the target colors with one of the source colors stochastically selected based on the transition probability.

18. The system of claim 16, wherein the target color palette comprises a clustered color palette generated by clustering the target color set via:

segmenting the target colors into at least one cluster based on a relationship of at least one color property of the target colors, and determining a cluster color to represent the at least one cluster, the cluster color determined as an average of the colors segmented into the at least one cluster.

19. The system of claim 18, wherein segmenting the target colors into the clustered color palette comprises, for each target color:

comparing the at least one color property of the target color and one or more segmented colors assigned to an active cluster;

adding the target color to the active cluster if the at least one color property of the target color and the one or more segmented colors is within a predefined threshold; and initializing a new cluster and adding the target color to the new cluster if the at least one color property of the target color and the one or more segmented colors is not within the predefined threshold.

20. The system of claim 19, the one or more processing devices to perform operations comprising generating a de-clustered destination color palette via de-clustering the destination color palette, prior to recoloring the target graphic, for each original target color associated with the destination color palette:

determining at least one color property difference value based on a difference of the at least one color property of the original target color and a corresponding cluster color determined for a cluster of the clustered color palette;

transforming the original target color to a modified color based on the at least one color property difference and the at least one color property of the corresponding destination color assigned to the cluster; and adding the modified color to the de-clustered destination color palette.

* * * * *